US009667804B1

United States Patent
Hall et al.

(10) Patent No.: US 9,667,804 B1
(45) Date of Patent: May 30, 2017

(54) EFFICIENT HUB SWITCHING FOR MOBILE NETWORK DEVICES

(71) Applicants: David R. Hall, Provo, UT (US); Mark D. Hall, Springville, UT (US); Craig Boswell, Draper, UT (US); Jedediah Knight, Provo, UT (US)

(72) Inventors: David R. Hall, Provo, UT (US); Mark D. Hall, Springville, UT (US); Craig Boswell, Draper, UT (US); Jedediah Knight, Provo, UT (US)

( * ) Notice: Subject to any disclaimer, the term of this patent is extended or adjusted under 35 U.S.C. 154(b) by 0 days.

(21) Appl. No.: 15/156,789

(22) Filed: May 17, 2016

(51) Int. Cl.
| | |
|---|---|
| *H04W 76/02* | (2009.01) |
| *H04M 11/00* | (2006.01) |
| *H04L 29/08* | (2006.01) |
| *H04L 12/44* | (2006.01) |
| *H04W 24/02* | (2009.01) |
| *H04L 27/10* | (2006.01) |
| *H04W 88/12* | (2009.01) |

(52) U.S. Cl.
CPC .......... *H04M 11/007* (2013.01); *H04L 12/44* (2013.01); *H04L 27/10* (2013.01); *H04L 67/12* (2013.01); *H04W 24/02* (2013.01); *H04B 2201/69* (2013.01); *H04W 88/12* (2013.01)

(58) Field of Classification Search
CPC ....... H04W 84/20; H04W 4/008; H04W 4/00; H04W 8/005; H04W 4/206; H01M 10/4207; H01M 10/4257; H01M 10/441; H04L 2209/122; H04L 41/0803; H04M 1/72505; H04M 1/0256; H04M 1/21; G06F 13/385
See application file for complete search history.

(56) References Cited

U.S. PATENT DOCUMENTS

| | | | | |
|---|---|---|---|---|
| 5,805,837 A | * | 9/1998 | Hoover ................. | G06F 13/362 710/110 |
| 2003/0212498 A1 | * | 11/2003 | Kramb ................... | G01H 1/003 702/33 |
| 2008/0028080 A1 | * | 1/2008 | Ashida ............... | G05B 19/0421 709/228 |

\* cited by examiner

*Primary Examiner* — Quan M Hua

(57) ABSTRACT

A system for efficient hub switching of mobile network devices is disclosed. The system includes a peripheral device (PD), a first control hub, and a second control hub. The PD includes a wireless long range transceiver and a microcontroller, and is controlled wirelessly by the first control hub. The first control hub and second network hub each have a wireless long range transceiver, hardware processors, and hardware memory that stores system operation information. The system operation information includes instructions for controlling the PD. Additionally, the system operation information includes instructions for listening for a response from the PD. The listening instructions include an expected response timeframe after the control instructions are sent. The system operation information further includes instructions for requesting the second control hub control the PD. Furthermore, the system operation information includes instructions for taking over control of the PD.

20 Claims, 25 Drawing Sheets

EFFICIENT HUB SWITCHING FOR MOBILE NETWORK DEVICES

TECHNICAL FIELD

This invention relates generally to the field of the internet of things, and more specifically to local network control of mobile network devices.

BACKGROUND

Home and office automation is an ever-growing market focused on streamlining and simplifying user experiences at home and work. The products and services that can be included in home and office automation systems vary widely based on user need. Customizable lights, adaptive blinds and thermometers, remotely controlled entry points, smart door locks, smart refrigerators, and smart washers are just a few products available and designed with the purpose of improving a user's life while at home and work. However, these products and services are limited by the wired and wireless communication networks of which they are a part. When a networked device moves outside the range of its corresponding control hub, in many cases the device becomes non-operational. Networks with one device communication hub suffer from limited range and limited number of controllable devices on the network. Multi-hub networks are difficult because devices have to be manually paired to each network hub either initially or whenever a mobile device moves from one hub's control range to another hub's control range.

SUMMARY OF THE INVENTION

A redundant star network is disclosed that overcomes or improves upon the limitations discussed above. In general, the system consists of two or more network hubs. Each network hub includes short and long-range wireless transceivers and hardware processors and memory to periodically test peripheral devices (PD) and update the network hubs controlling those devices. In the case that a PD does not respond to test signals, the control hub sends a signal to another control hub to take over control of the PD. Control hub redundancy allows for ensured and enduring functionality of PDs networked to the redundant star network. In the case that a PD does not respond to control signals from its corresponding control hub, control of the PD is rerouted to another control hub, ensuring that the user can continue to control the peripheral device via the network. The system also includes, in some embodiments, a cloud server that is networked to one or more of the control hubs. The cloud server stores the system operation information for the network, which can be accessed by a user via a smartphone, tablet, or computer. The user is notified via the server when a control hub when control for one or more peripheral devices has switched hubs.

In one embodiment, the system includes a PD, a first control hub, and a second control hub. The PD includes a wireless long range transceiver and a microcontroller, and is controlled wirelessly by the first control hub. The first control hub and second network hub each have a wireless long range transceiver, hardware processors, and hardware memory that stores system operation information. The system operation information includes instructions for controlling the PD by executing the control instructions at the first control hub hardware processors and transmitting the executed control instructions designated for the PD via the first control hub wireless long range transceiver. Additionally, the system operation information includes instructions for listening for a response from the PD in response to the control instructions. The listening instructions include an expected response timeframe after the control instructions are sent. The system operation information further includes instructions for requesting the second control hub control the PD. The first control hub processors execute the request instructions when the first control hub does not receive the response from the PD in response to the control instructions within the expected response timeframe. The first control hub transmits, via the first control hub transceiver, a takeover request designated for the second control hub. Furthermore, the system operation information includes instructions for taking over control of the PD. The second control hub executes the takeover instructions upon receiving the takeover request. The second control hub controls the PD by executing the control instructions at the second control hub processors and transmitting the executed control instructions designated for the PD via the second control hub wireless long range transceiver.

In another embodiment, the system includes a PD, a first control hub, and two or more additional control hubs. The PD includes a wireless long range transceiver and a microcontroller, and is controlled wirelessly by the first control hub. The first control hub and two or more additional control hubs each have a wireless long range transceiver, one or more hardware processors, and hardware memory that stores system operation information. The system operation information includes instructions for controlling the PD by executing the control instructions at the first control hub hardware processors and transmitting the executed control instructions designated for the PD via the first control hub wireless long range transceiver. The system operation information also includes instructions for transmitting a test signal designated for the peripheral device. Additionally, the system operation includes instructions for listening for a response from the PD in response to the control instructions, the test signal, or both. The listening instructions include an expected response timeframe after the control instructions, the test signal, or both are sent. The system operation information further includes instructions for requesting the additional control hubs transmit the test signal. The first control hub processors execute the request instructions when the first control hub does not receive the response from the PD within the expected response timeframe. Additionally, the system operation information includes instructions for taking over control of the PD. At least one of the additional control hubs executes the takeover instructions upon receiving the test signal response from the PD. The at least one of the additional control hubs controls the PD by executing the control instructions at the at least one of the additional hub hardware processors and transmitting the executed control instructions designated for the PD via the at least one additional control hub wireless long range transceiver.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1:
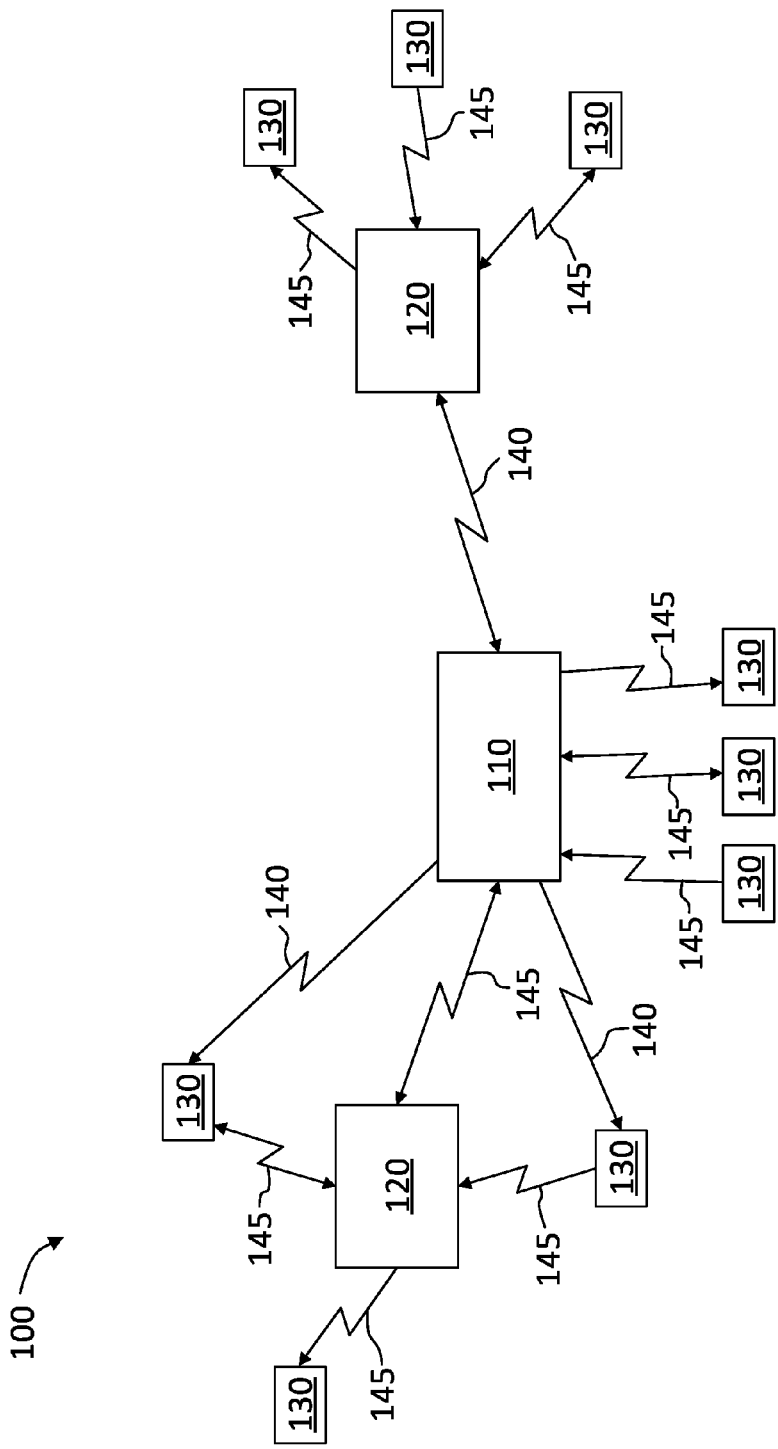
FIG. 1 depicts one embodiment of a redundant star network according to the claimed invention.

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

Throughout this specification, reference is made to "testing" and "controlling," such as "test signals," "control signals," "test instructions," "control instructions," and the like. As used herein, "test" refers to instructions or signals that, when received by a device, elicit a test response without further action elicited from the device. For example, in some embodiments, a test signal is encoded with data bits for designating a test receive device, data bits identifying the test transmit device, and data bits for requesting a test response, in addition to other data required for the signal to be properly processed. The test response is encoded with data bits designating the test transmit device, data bits identifying the test receive device, and data bits that respond to the test response request which the test transmit device recognizes. In many such embodiments, the information transmitted is limited to the operational test, omitting control instructions that require additional power and functionality of the test receive device.

In contrast to "test," as used herein "control" refers to instructions or signals the instruct a device to perform an operation. In many embodiments, a control instruction or signal does not require a response. However, in many other embodiments, a control instruction or signal requests return information. For example, in one embodiment, a hub transmits a control signal to a door access control device, instructing the door access control device to update a locally-stored table of authorized PINs. The control signal includes instructions that the door access control device respond to the control instructions confirming the table is updated, and the update instructions are completed when the door access control device transmits the response. In another embodiment, the update instructions are completed when the door access control device updates the table.

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller. As used herein, "microcontroller" refers to any combination of hardware memory and hardware processors suitable for the system and methods described herein. For example, in some embodiments, a microcontroller is a 256 kb-RAM microcontroller. In other embodiments, the microcontroller is a 64 kb-RAM microcontroller. In yet other embodiments, the hardware memory and hardware processors are networked on a PCB, where the hardware memory has megabytes to terabytes of memory, and where the hardware processors include processing speeds of 1 MHz to 16 GHz.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 depicts one embodiment of a redundant star network 100 according to the claimed invention. Redundant star network 100 includes primary network hub (PNH) 110, one or more secondary network hubs (SNH) 120 located remotely from PNH 110, and one or more peripheral devices (PD) 130. The PDs 130 are located remotely from the PNH 110 and the SNH 120. PNH 110 has one or more wireless Long range transceivers and one or more microcontrollers having communication firmware for long range spread spectrum (SS) and narrowband frequency shift keying (FSK) signal communication via the PNH Long range transceiver. SNH 120 similarly has one or more wireless Long range transceivers and one or more microcontrollers having communication firmware for long range SS and narrowband FSK signal communication via the SNH Long range transceiver. PD 130 also has, in one embodiment of redundant star network 100, an actuation mechanism, at least one wireless Long range transceiver and at least one corresponding microcontroller having communication firmware for long range SS and narrowband FSK signal communication via the PD 130 Long range transceiver. In another embodiment, PD 130 has an actuation mechanism, at least one wireless receiver and at least one corresponding microcontroller having receive firmware for long range SS and narrowband FSK signal communication. In yet another embodiment, PD 130 has an actuation mechanism, at least one wireless transmitter and at least on corresponding microcontroller having transmit firmware for long range SS and narrowband FSK signal communication.

Though only a few PDs 130 are depicted, in some embodiments, redundant star network 100 includes several more PDs 130. For example, in one embodiment, PNH 110 is networked to up to 128 PDs 130. In the same and/or other embodiments, SNH 120 is networked to up to 64 PDs 130.

As used throughout the claims and specification, long range means any range from 0.5 to 30 miles. In some embodiments, long range means approximately 1 mile. In other embodiments, long range means ranging from 1 to 26 miles. In yet other embodiments, long range means approximately 10 miles.

PNH 110, SNH 120, and/or PD 130 communicate via long range SS signals 140 and/or narrowband FSK signals 145 based on a range between communicating devices. For example, in one embodiment, PNH 110 communicates with one PD 130 via long range SS signals 140 and with a second PD 130 via narrowband FSK signals 145. In such an example, this configuration would be particularly beneficial where the first PD 130 is outside a PNH-PD narrowband FSK communication range but within a PNH-PD long range SS communication range. In another embodiment, a PD 130 is mobile. PNH 110 communicates with PD 130 via narrowband FSK signals 145 when PD 130 is within the PNH-PD narrowband FSK range, and via long range SS signals 140 when PD 130 is outside the PNH-PD narrowband FSK range. In another embodiment, PNH 110 communicates with PD 130 via long range SS signals 140 even when PD 130 is within the PNH-PD narrowband FSK range. Though not shown, in some embodiments, PNH 110 and SNH 120 communicate via a wired connection, such as an Ethernet communication link.

Many PDs are controlled by instructions consisting of hundreds of bits to hundreds of kilobits of data. Such instructions thus do not need to be communicated over high-data rate networks, thus decreasing the power consumed in transmitting and receiving information. Rather, low-data instructions can be transmitted via a low-data rate signal while still having a fast response time, such as within one second. This is particularly important for battery-operated PDs. PD 130 is, in some embodiments, such a PD, where PD 130 is battery-operated and is controlled by instructions consisting of hundreds of bits to hundreds of thousands of bits. In one embodiment, PD 130 requires from 100 bits to 500 kilobits of data for instruction. In this embodiment, long range SS signals 140 communicate instructions to PD 130 at a rate from 100 bits per second (bps) to 500 kilobits per second (kbps). In another embodiment, PD 130 requires from 200 bits to 300 kilobits of data for instruction. In this other embodiment, long range SS signals 140 communicate instructions to PD 130 at a rate from 200 bps to 300 kbps. In yet another embodiment, PD 130 requires from 1 to 100 kilobits of data for instruction. In this embodiment, long range SS signals 140 communicate instructions to PD 130 at a rate from 1 to 100 kbps.

In one example, PNH 110 communicates with SNH 120 via long range SS signals 140. SNH 120 processes communications from PNH 110 and forwards information to PD 130 via narrowband FSK signals 145. Similarly, in another embodiment, SNH 120 receives information from PNH 110 via narrowband FSK signals 145, processes the information, and forwards information to PD 130 via long range SS signals 140. As another example, communication between PNH 110, SNH 120 and PD 130 is accomplished via solely long range SS signals 140 or solely narrowband FSK signals 145.

Long range SS signals 140 are any time of spread spectrum signal. For example, in one embodiment, long range SS signals 140 are long range spread spectrum frequency hopping (SSFH) signals. In another embodiment, long range SS signals 140 are long range direct-sequence spread spectrum (DSSS), time-hopping spread spectrum (THSS), or chirp spread spectrum (CSS) signals. Other embodiments include combinations of two or more of SSFH, DSSS, THSS, and/or CSS signals. In embodiments comprising SSFH, DSSS, THSS, and/or CSS signals, the microcontrollers described above include firmware having instructions for communicating using these signals. For example, in one embodiment, the PNH microcontroller firmware includes instructions for long range SSFH signal communication. In the same or another embodiment, the SNH microcontroller firmware similarly includes instructions for long range SSFH signal communication. Additionally, in the same or other embodiments, the PD microcontroller firmware includes instructions for long range SSFH signal communication. In one embodiment, the microcontroller firmware of the PNH, SNH and PD all include instructions for long range SSFH signal communication.

In one embodiment, each SNH 120 is associated with a particular group of PDs 130, where each PD 130 is associated with only one SNH 120. PNH 110 stores high-level system operation information and instructions. The system operation information and instructions include operation instructions for SNHs 120 and PDs 130, and information about which PD 130 is associated with which SNH 120. PNH 110 transmits operation information and instructions to each SNH 120 for that hub only and its associated PDs. SNH 120 stores the operation information and instructions sent by PNH 110 and transmits and/or receives information, including instructions, to and/or from its associated PDs 130. Thus, PNH 110 acts as a system-wide control hub, and SNHs 120 act as local control hubs. This embodiment allows for robust communication with many devices while avoiding the interference and lag time of a single-hub system.

PD 130 may be any of a variety of apparatuses that include an actuation mechanism. In one embodiment, PD 130 is a gate for an access-controlled enclosure. For example, the enclosure, in one embodiment, is a perimeter fence surrounding a property such as a business, home, industrial complex, prison, or other access-controlled enclosures. In another embodiment, PD 130 is a door for allowing access to a structure or room within a structure. In one embodiment, PD 130 is a climate-control device, such as an HVAC system, for adjusting heating and cooling output inside a building. In yet another embodiment, PD 130 is an automated blind system and/or a light switch and/or system of light switches. PD 130 is also, in some embodiments, any of various household appliances, such as a refrigerator, stove, oven, dishwasher, clothes washing machine, clothes dryer, toilet, bath and/or shower, and kitchen appliances. In other embodiments, PD 130 is a personal computer, a printer/scanner, a fax machine and/or a telephone.

PD 130 is also, in some embodiments, any of a variety of commercial and/or industrial equipment. For example, in one embodiment, PD 130 is an elevator. In another embodiment, PD 130 is one of a variety of manufacturing equipment, such as a conveyor belt, a pump, a sensor, a motor, and/or a 3D printer. In yet other embodiments, PD 130 is a vehicle and/or a vehicle component such as a starter or a motor. In one embodiment, PD 130 is a drone.

Redundant star network 100 is a stand-alone network that offers several benefits. First, redundant star network 100 operates independently of the Internet. Thus, PNH 110 can communicate with each SNH 120 and PD 130 even when an external Internet connection is down. Additionally, in some embodiments of redundant star network 100, PNH 110, SNHs 120 and PDs 130 are equipped with backup power. The backup power is, in some embodiments, local, such as a battery. In the same or other embodiments, the backup power is an off-grid power source such as a generator or batteries. In such embodiments, connectivity between PNH 110, SNHs 120 and PDs 130, and operability of each, continues through a grid-power outage.

An additional benefit of the stand-alone dual modulation network described above is inherent security. In order for a device to interpret a long range SS signal, it must know which frequencies to check. In redundant star network 100, each of PNH 110, SNHs 120 and PDs 130 are programmed with a unique frequency sequence for redundant star network 100. External observers not aware of the unique frequency sequence would interpret the signals from redundant star network 100 as noise, even if the observer were trying to intercept signals from redundant star network 100. For added security, PNH 110, SNHs 120 and PDs 130 include, in some embodiments, tamper firmware that notifies an authorized user that the device has been tampered with before an unauthorized user can obtain the frequency sequence, automatically changes the frequency sequence, and updates other devices on the network with the new frequency sequence. For example, PNH 110 receives a tamper signal from PD 130. PNH 110 changes the frequency sequence and updates SNHs 120 and other PDs 130 with the new sequence. PNH 110 then notifies an authorized user that PD 130 has been tampered with and the frequency sequence has been updated.

The foregoing PD 130 embodiments described are examples only, and are not to be construed as limiting the scope of PD 130. Rather, PD 130 is any device or system that includes an actuation mechanism that performs a tangible function, such as turning a light in a room on or off, unlocking and/or opening a gate, and opening and/or closing blinds.

Figure 2:
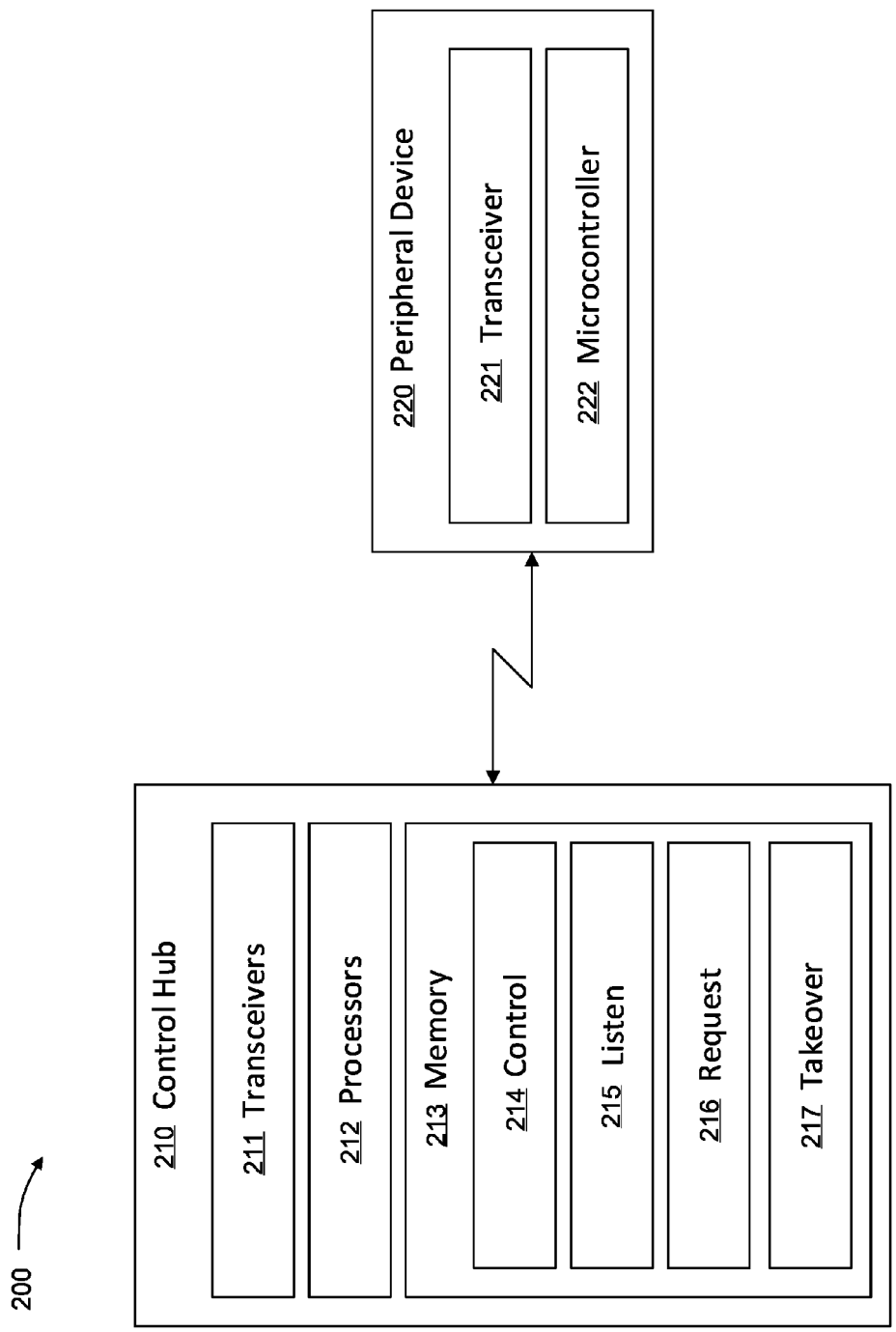
FIG. 2 depicts another embodiment of a control hub that controls a peripheral device, and the peripheral device.

FIG. 2 depicts another embodiment of a control hub that controls a peripheral device, and the peripheral device. Network 200 includes control hub 210 and PD 220. PD 220 includes wireless long range transceiver 221 and microcontroller 222. Control hub 210 includes one or more wireless long range transceivers 211, one or more hardware processors 212, and hardware memory 213. Hardware memory 213 stores system operation information for network 200. The system operation information includes instructions for controlling PD 220. Control hub 210 controls PD 220 by executing control instructions 214 at hardware processors 212 and transmitting 530 the executed control instructions, which are designated for PD 220, via transceiver 211. For example, in one embodiment, PD 220 is an automated room light, and the control instructions include instructions to dim the light. Control hub 210 executes control instructions 214 and transmits signal 230 instructing PD 220 to dim. PD 220 receives the signal at transceiver 221 and, in response to the instruction, dims.

The system operation information also includes instructions for listening for response 231 from the peripheral device in response to control instructions 214. Listening instructions 215 include an expected response timeframe after control instructions 213 are sent. When control hub 210 does not receive response 231 from PD 220 in response to control instructions 214 sent via control signal 231 within the expected response timeframe, the system information includes request instructions 216 for requesting another control hub (not depicted here, but shown in subsequent figures) take over control of PD 220. Processors 212 execute request instructions 216, and control hub 210 transmits, via transceivers 211, a takeover request designated for the other control hub. The system operation information is also stored by the other control hub, and includes takeover instructions 217 for taking over control of PD 220. The other control hub executes takeover instructions 217 upon receiving the takeover request from control hub 210. The other control hub controls PD 220 by executing control instructions 214 at other control hub hardware processors and transmitting the executed control instructions 214 designated for PD 220 via an other control hub wireless long range transceiver. PD 220 receives control instructions 214 from the other control hub via transceiver 221 and executes control instructions 214 at microcontroller 222. For example, in one embodiment, PD 210 is an electronic tablet. Control instructions 214 include instructions for sending the tablet a notification when a door is accessed. However, the tablet is taken outside control hub's 210 communication range. Control hub 210 notifies another control hub to send the door access notification to the tablet, which is in the other control hub's communication range, and the other control hub sends the notification to the tablet.

Figure 3A:
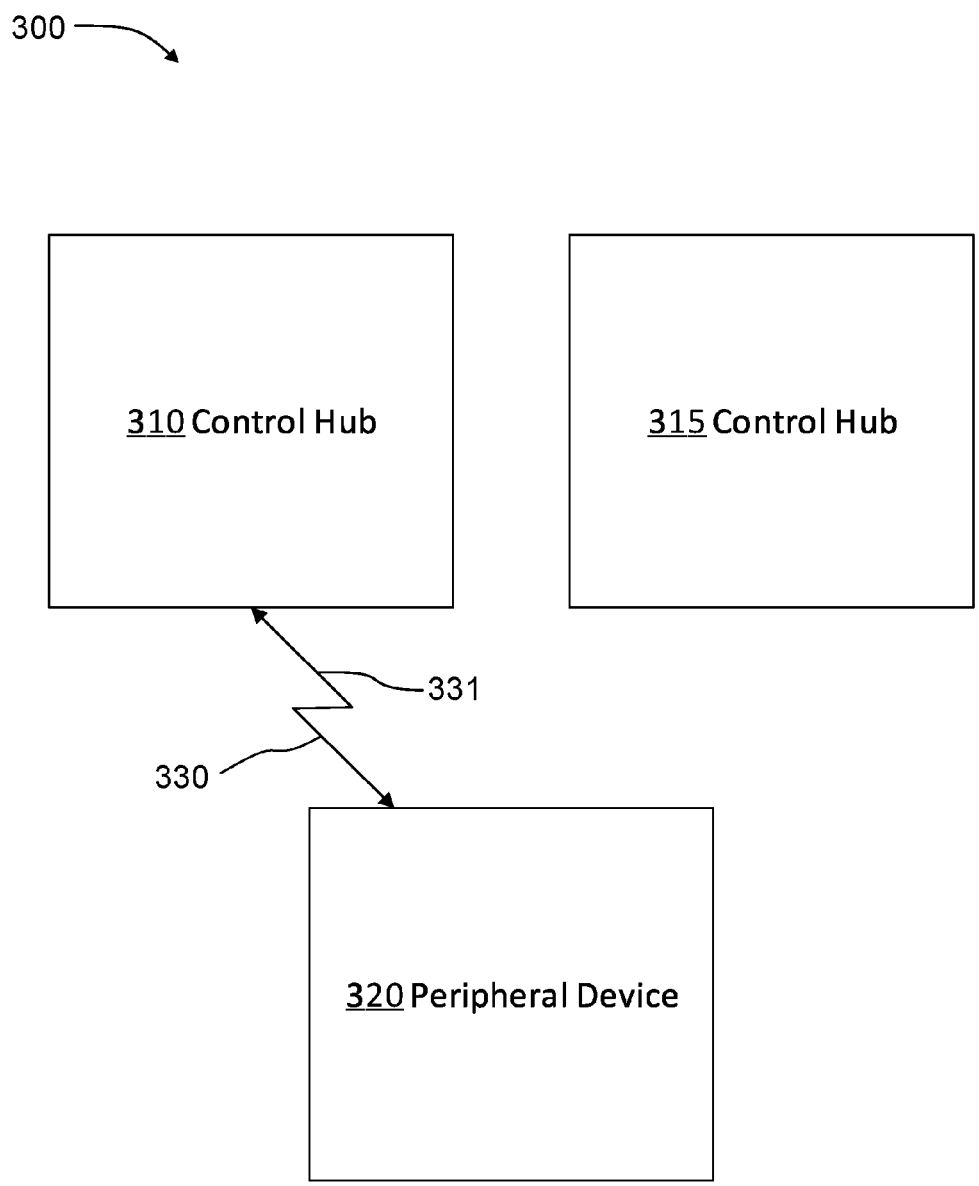
FIGS. 3A-D depict an embodiment of a redundant star network including two hubs.
Figure 3B:
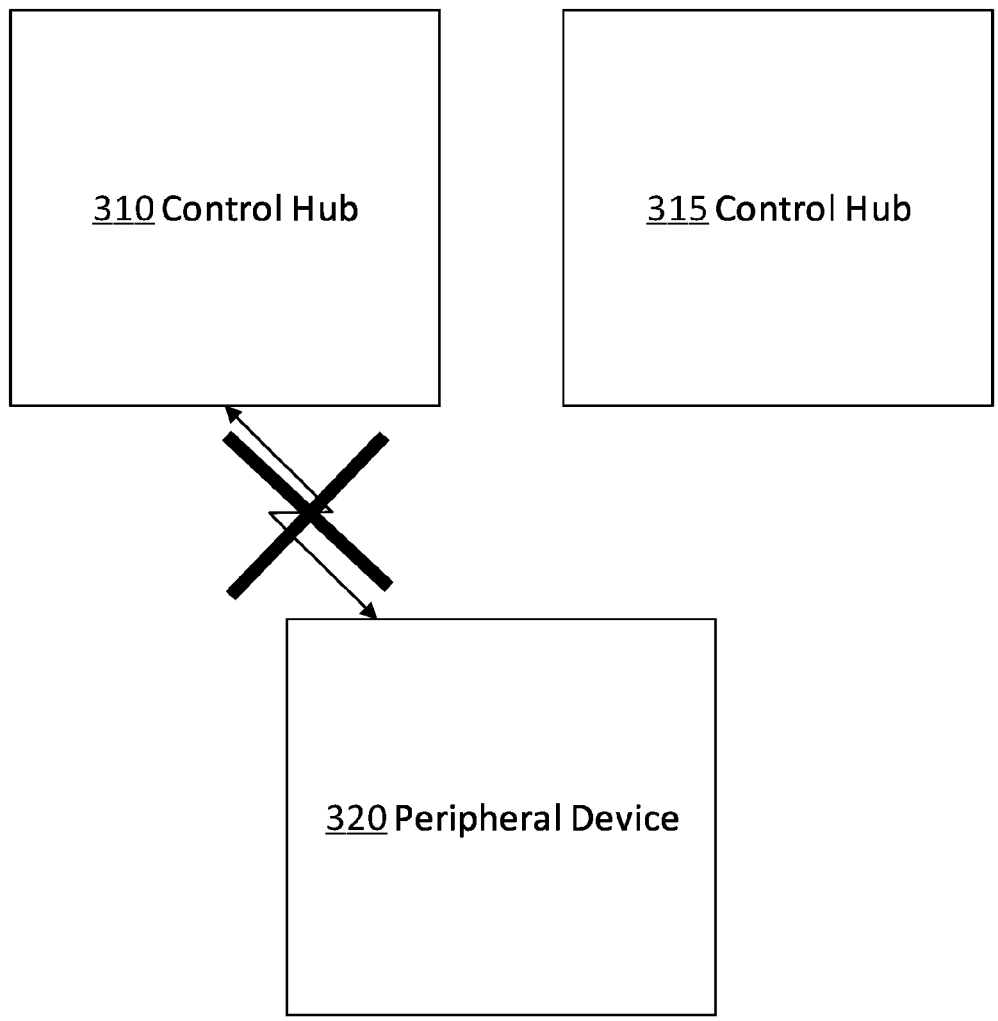
Figure 3C:
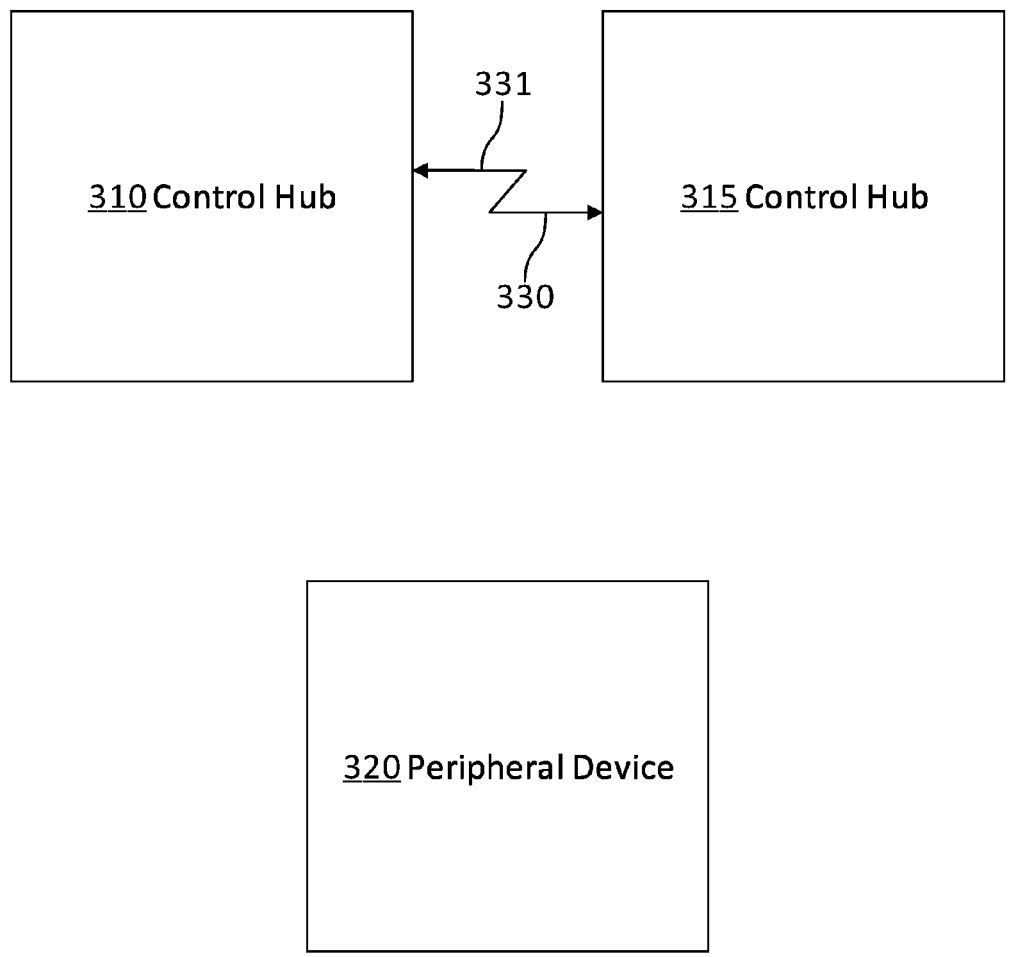
Figure 3D:
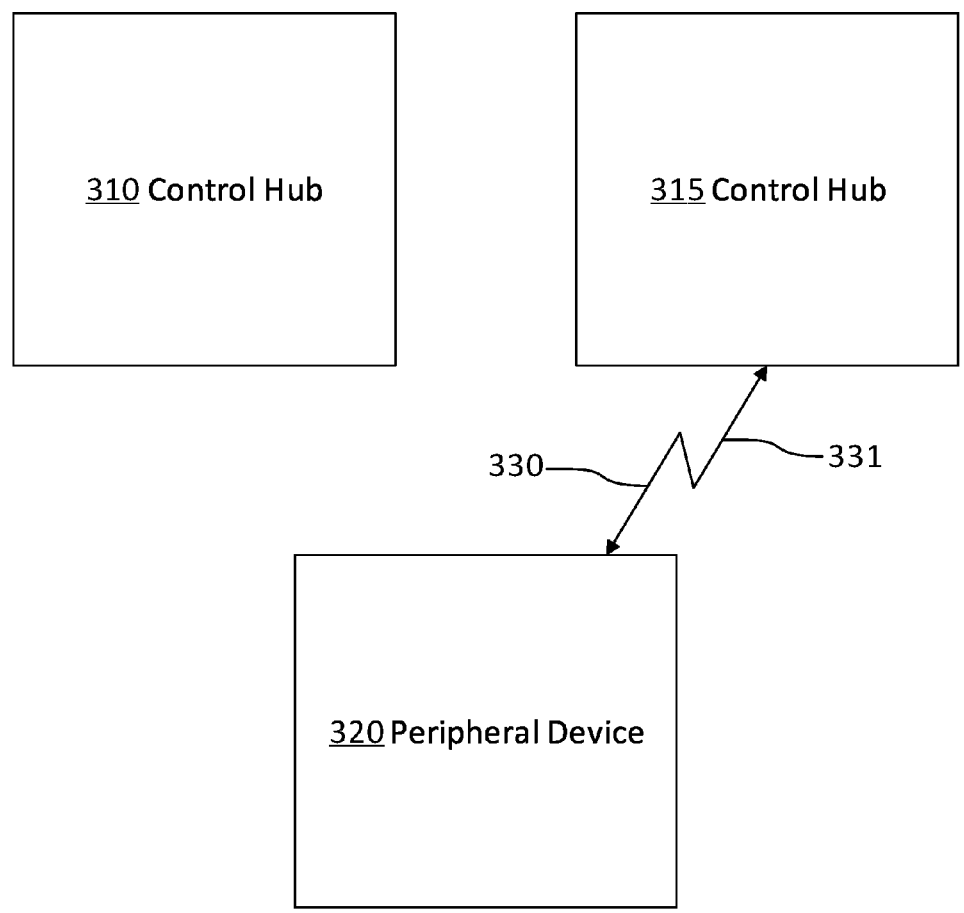

FIGS. 3A-D depict an embodiment of a redundant star network including two hubs. Network 300 includes control hub 310, a second control hub 315, and PD 320. Control hub 310 and PD 320 are similar to control hub 210 and PD 220 described above. Similar to control hub 310, control hub 320 includes a wireless long range transceiver, one or more hardware processors, and hardware memory that stores the system operation information. Control hub 310 controls PD 320 via control signals 330, and PD 320 responds 331 to control instructions. As depicted in FIG. 3B, in some embodiments, control signals 330 and response signals 331 fail to establish communication between control hub 310 and PD 320. As depicted in FIG. 3C, control hub 310 sends takeover request signals 340 to control hub 315 to request that control hub 315 take over control of PD 320. In some embodiments, control hub 315 responds 341 to acknowledge the takeover request. As depicted in FIG. 3D, control hub 315 transmits the control instructions to PD 320 via control signals 330. When PD 320 is within a communication range of control hub 315 and PD 320, PD 320 executes the control instructions and, in some embodiments, responds 331 to control signals 330. In some embodiments, control hub 315 notifies control hub 310 that PD 320 responds to control signals 330, and each updates the system operation information to designate control hub 315 as PD's 320 control hub.

As depicted above with regard to FIGS. 2 and 3A-D, the PD microcontroller, the control hub hardware memory, and/or the other control hub hardware memory include signal communication instructions for communicating long range spread spectrum signals, narrowband frequency shift keying signals, or both. The signal communication instructions are executed by one or more of the PD microcontroller, the control hub hardware processors, or the other control hub hardware processors to transmit long range spread spectrum signals, narrowband frequency shift keying signals, or both, via one or more of the PD transceiver, the control hub transceiver, or the other control hub transceiver.

FIGS. 4A-D depict a redundant star network that communicates with a cloud server and user device. Network 400 includes control hub 410, control hub 415, and PD 420, each of which are similar to the control hubs and PDs described above with regards to FIGS. 2 and 3A-D. Additionally, network 400 includes server 450, which is one among a cloud of servers. Server 450 is networked to control hub 415 and, in some embodiments (though not depicted) control hub 415 via wired network connection 451. Server 450 includes hardware memory that stores the system operation information. Server 450 is also, in the depicted embodiment, networked to user device 460, and pushes system information, such as updates and operations performed by networked devices, to user device 460.

Figure 4A:
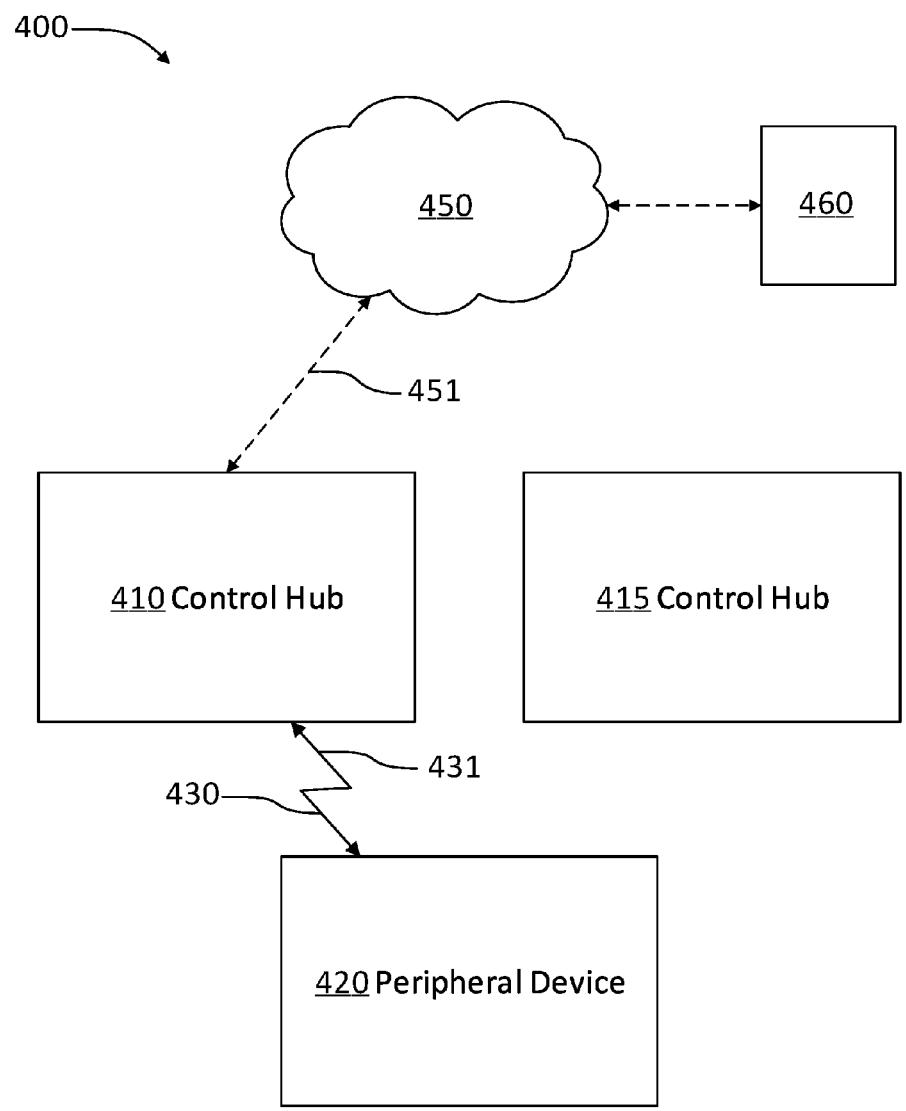
FIGS. 4A-D depict a redundant star network that communicates with a cloud server and user device.
Figure 4B:
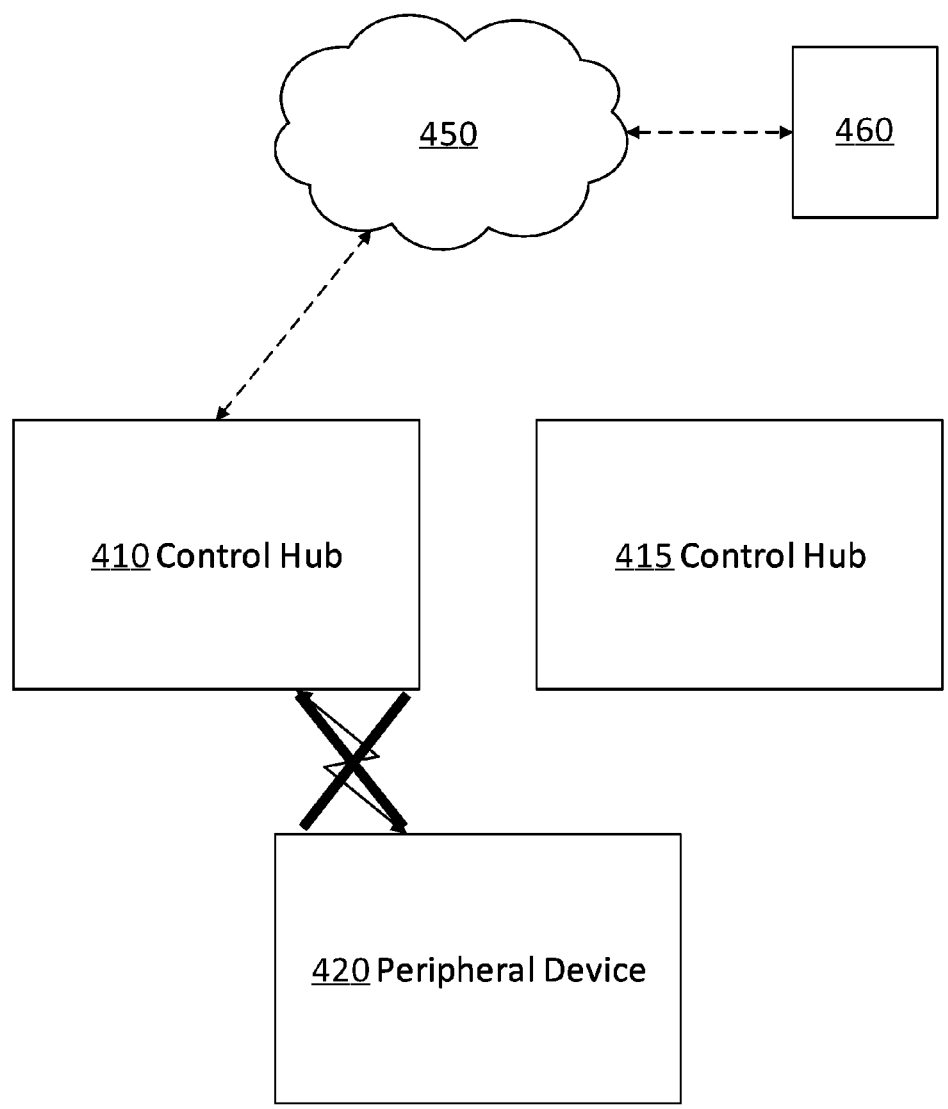
Figure 4C:
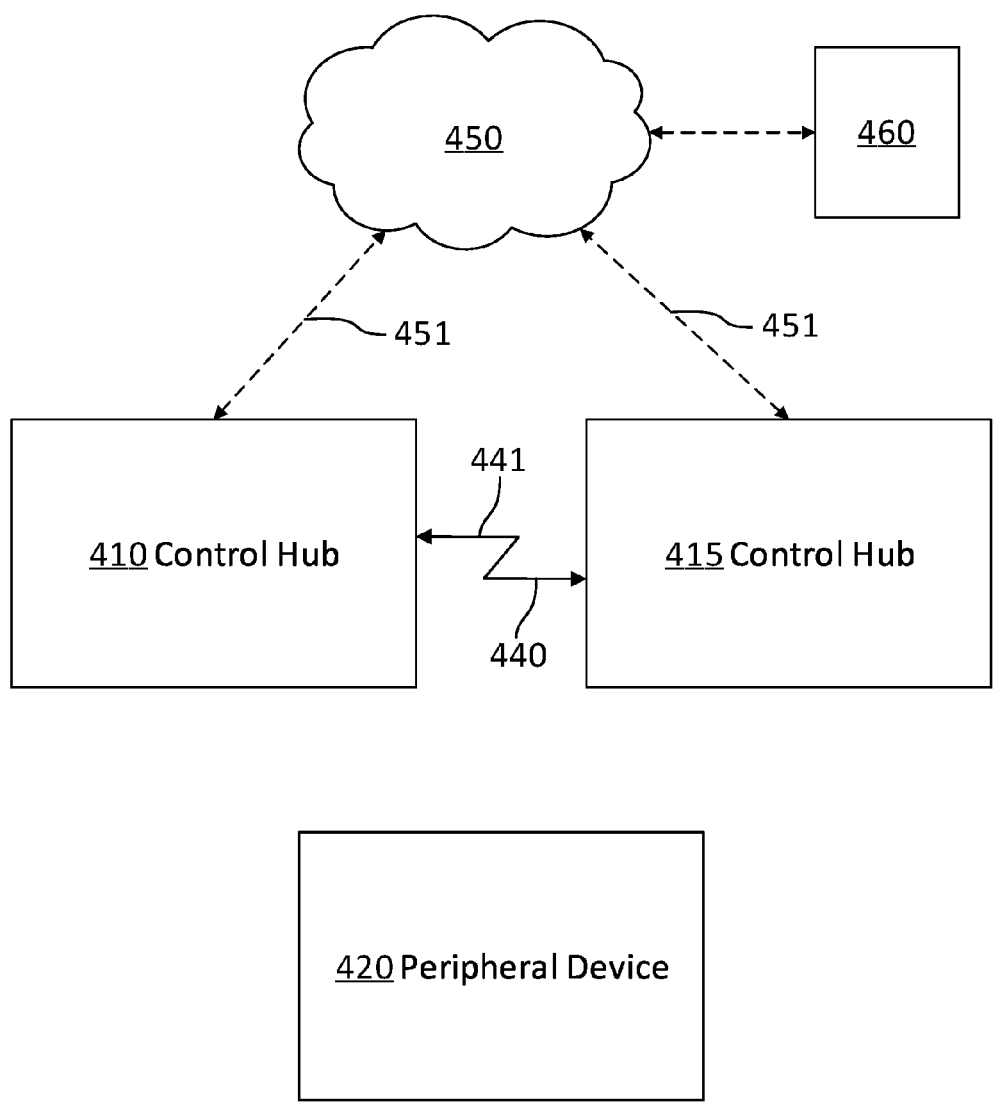

Control hub 410 controls PD 420 via control signals 430. In some embodiments, PD 420 responds to control signals 430 when the control instructions are executed by PD 420 via response signals 431. As depicted in FIG. 4B, in some embodiments, control signals 430 and response signals 431 fail to establish communication between control hub 410 and PD 420. As depicted in FIG. 3C, control hub 410 sends takeover request signals 440 to control hub 415 to request that control hub 415 take over control of PD 420. In some embodiments, control hub 415 responds 441 to acknowledge the takeover request. Additionally, in some embodiments, control hub 410 and/or control hub 415 transmit the takeover request and/or acceptance of the takeover request via wired network connection 451. For example, in one embodiment, the system operation information includes instructions that instruct control hub 410 to notify server 450 response 431 from PD 420 is not received by control hub 410, and control hub 410 requested control hub 415 take over control of PD 420. Furthermore, in some embodiments, the server hardware memory stores instructions that instruct server 450 to notify a user via user device 460 response 431 from PD 420 is not received by control hub 410, and control hub 410 requested control hub 415 take over control of PD 420.

Figure 4D:
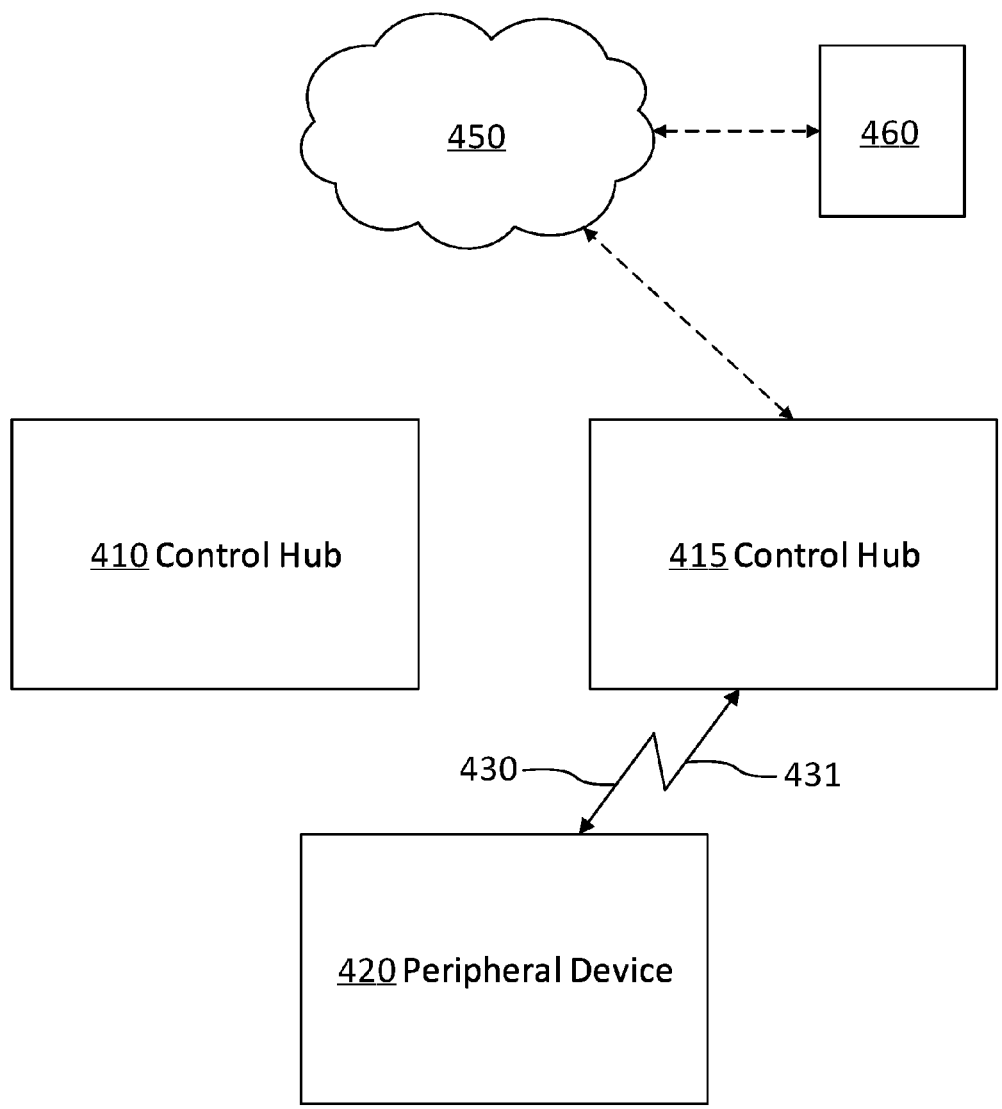

As depicted in FIG. 4D, control hub 415 transmits the control instructions to PD 420 via control signals 430. When PD 420 is within a communication range of control hub 415 and PD 420, PD 420 executes the control instructions and, in some embodiments, responds via response signals 431 to control signals 430. In some embodiments, the system operation information includes instructions that instruct control hub 415 to notify server 450 the takeover instructions are executed by control hub 415. In further embodiments, the server hardware memory stores instructions that instruct server 450 to notify a user via user device 460 the takeover instructions are executed by control hub 415.

Figure 5:
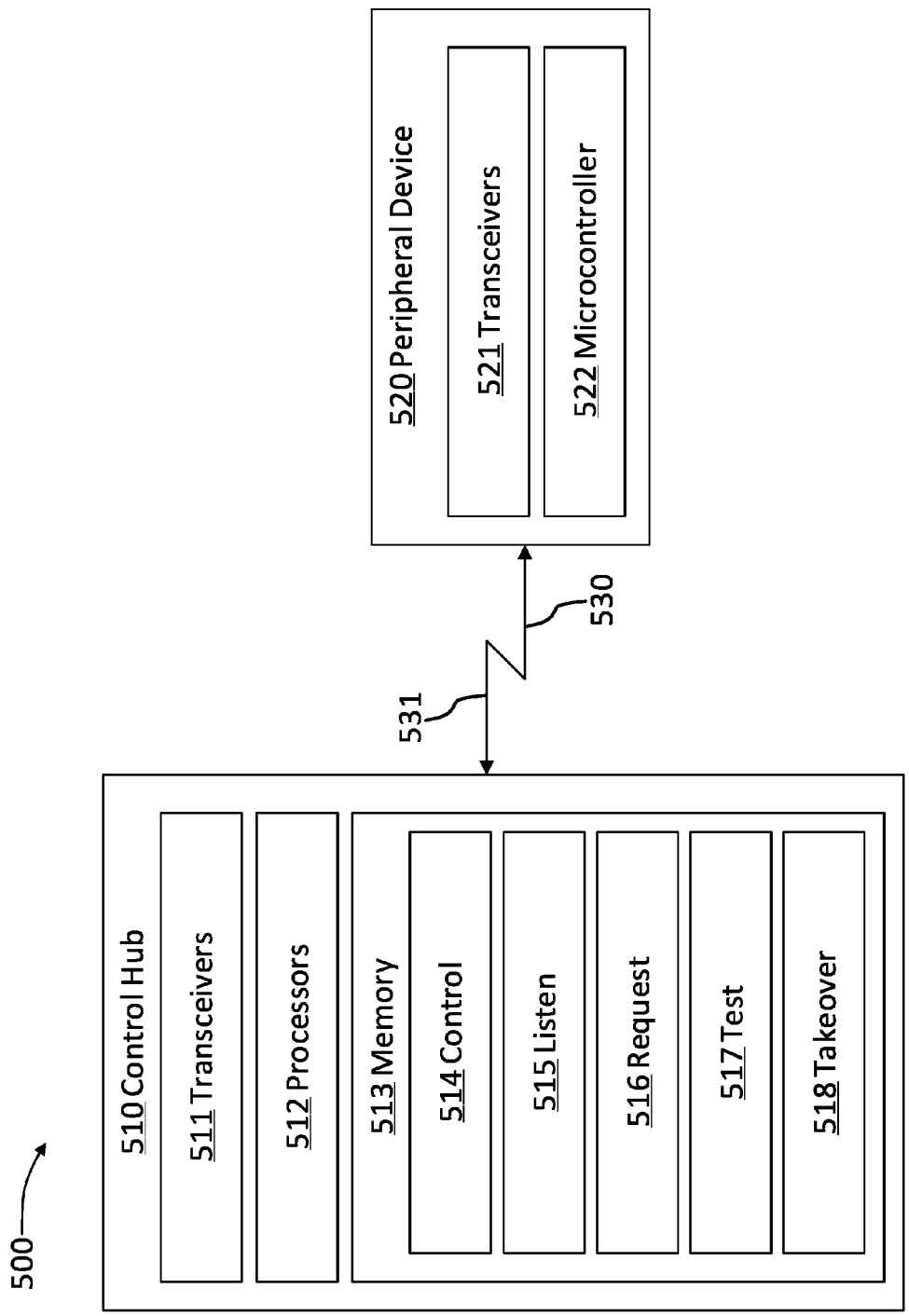
FIG. 5 depicts another embodiment of a control hub that controls a peripheral device, and the peripheral device.

FIG. 5 depicts another embodiment of a control hub that controls a peripheral device, and the peripheral device, similar to FIG. 2. Network 500 includes control hub 510 and PD 520. PD 520 includes wireless long range transceiver 521 and microcontroller 522. Control hub 510 includes one or more wireless long range transceivers 511, one or more hardware processors 512, and hardware memory 513. Hardware memory 513 stores system operation information for network 500. The system operation information includes instructions for controlling PD 520. Control hub 510 controls PD 520 by executing control instructions 514 at hardware processors 512 and transmitting the executed control instructions, which are designated for PD 520, via transceiver 511. Control hub 510 transmits control instructions 514 to PD 520 via control signals 530.

The system operation information also includes instructions for listening for response 531 from the peripheral device in response to control instructions 514. Listening instructions 515 include an expected response timeframe after control instructions 514 are sent. When control hub 510 does not receive response 531 from PD 520 in response to control instructions 514 sent via control signal 531 within the expected response timeframe, the system information includes request instructions 516 for requesting two or more additional control hubs (not depicted here, but shown in subsequent figures) test PD 520 by transmitting a test signal designated for PD 520. The system operation information includes test instructions 517, which instruct control hub 510 and/or the other control hubs to transmit the test signal. Processors 512 execute request instructions 516, and control hub 510 transmits, via transceivers 511, the test request designated for the other control hubs. The system operation information is also stored by the other control hubs, and includes takeover instructions 518 for taking over control of PD 520. One of the other control hubs establishes a connection with PD 520, and then executes takeover instructions 518 upon receiving a test signal response from PD 520. The connected control hub controls PD 520 by executing control instructions 514 at connected control hub hardware processors and transmitting the executed control instructions 514 designated for PD 520 via a connected control hub wireless long range transceiver. PD 520 receives control instructions 514 from the connected control hub via transceiver 521 and executes control instructions 514 at microcontroller 522.

Figure 6A:
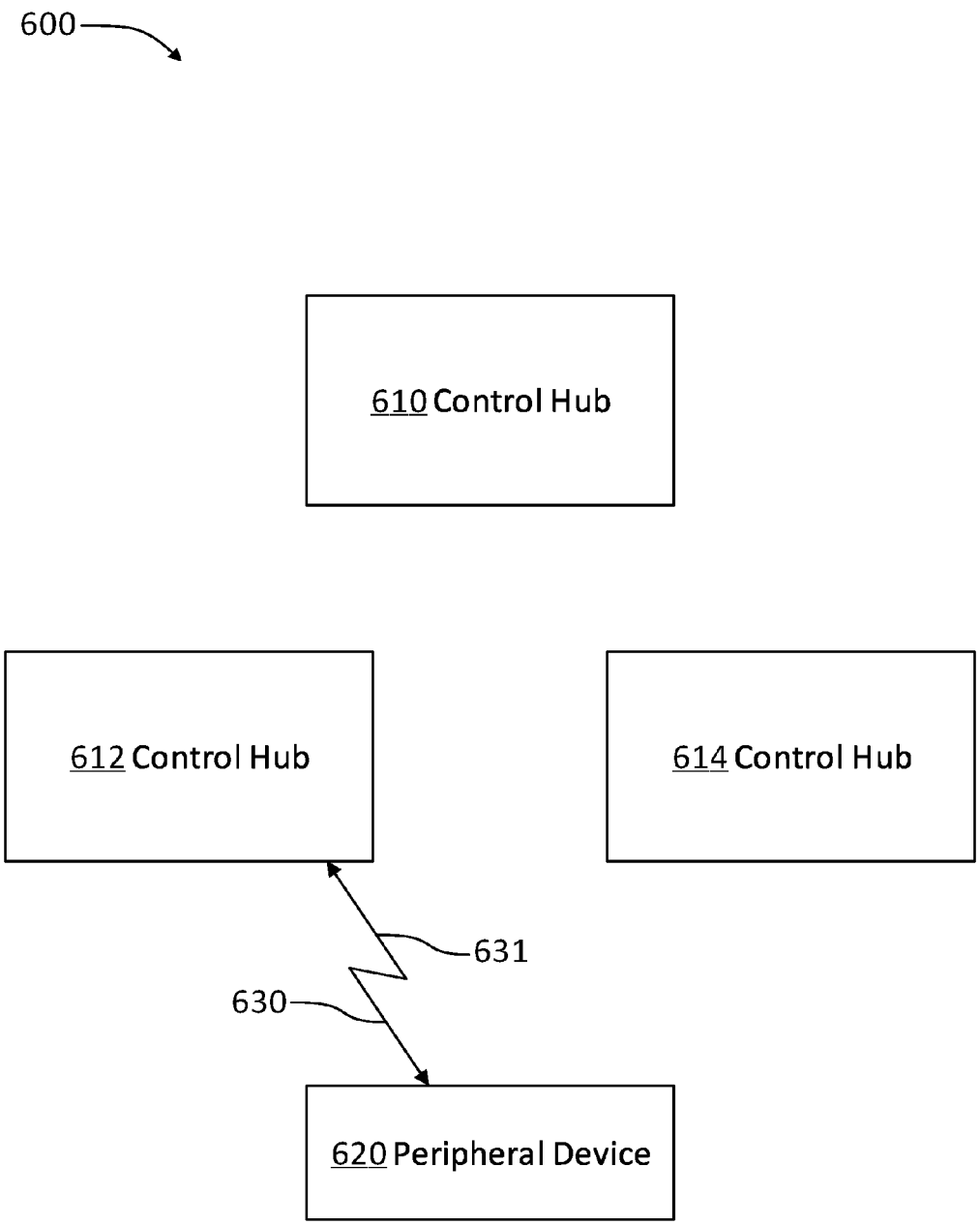
FIGS. 6A-E depict an embodiment of a redundant star network including multiple hubs.
Figure 6B:
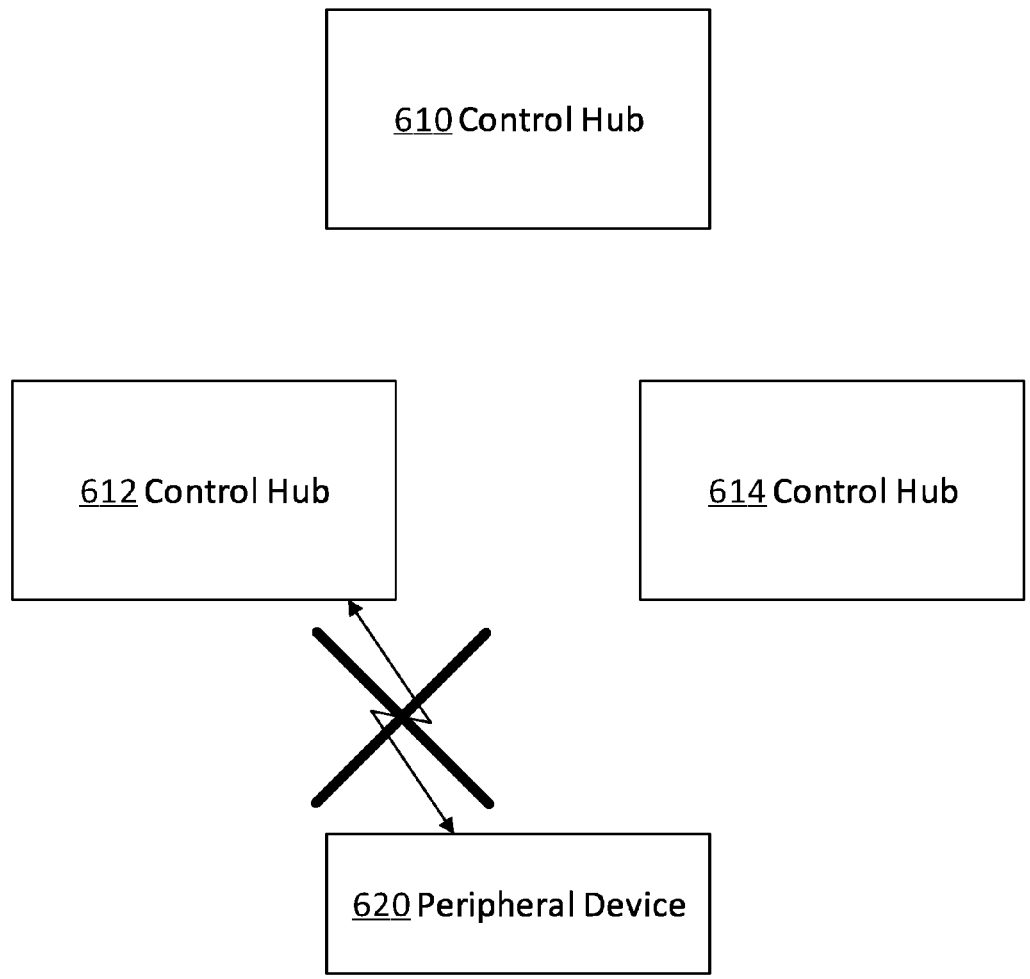
Figure 6C:
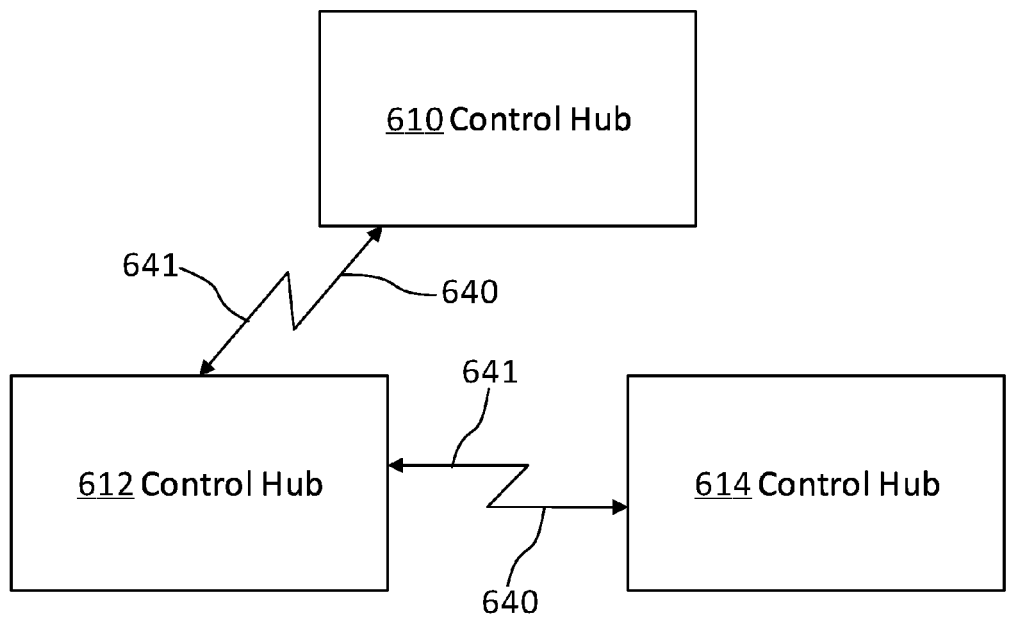
Figure 6D:
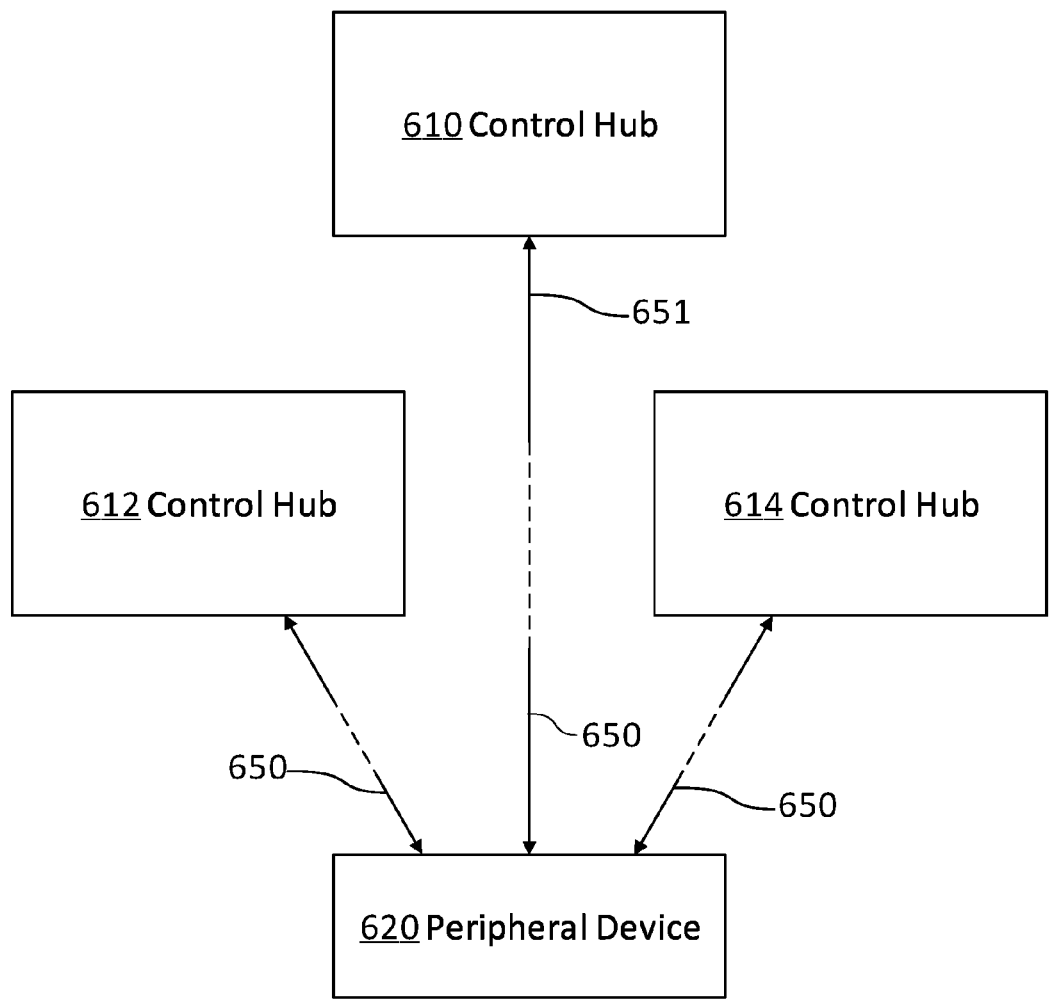
Figure 6E:
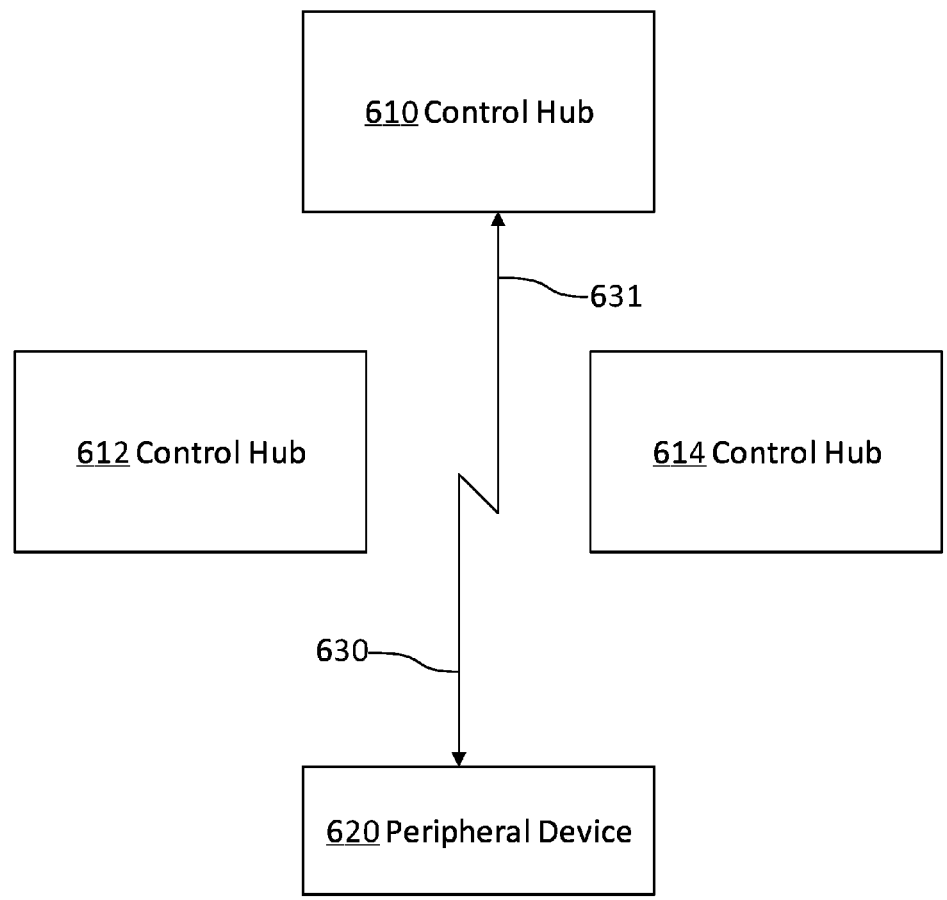

FIGS. 6A-E depict an embodiment of a redundant star network including multiple hubs. Network 600 includes control hub 610, second control hub 612, third control hub 614, and PD 620. Control hubs 610, 612, 614 and PD 620 are similar to control hub 510 and PD 520 described above, respectively. Control hub 612 controls PD 620 via control signals 630, and PD 620 responds via response signals 631 to control instructions from control hub 612. As depicted in FIG. 6B, in some embodiments, control signals 630 and response signals 631 fail to establish communication between control hub 612 and PD 620. As depicted in FIG. 6C, control hub 612 sends test request signals 640 to control hubs 610, 614 to request that control hubs 610, 614 test whether PD 620 is within a transmit receive range for either control hub 610, 614. In some embodiments, control hubs 610, 614 respond via test request response signals 641 to acknowledge the test request. As depicted in FIG. 6D, control hubs 610, 612, 614 send test signals 650 to test whether PD 620 is within a transmit-receive range for any of control hubs 610, 612, 614. When PD 620 is within a transmit receive range, such as within a transmit-receive range between control hub 610 and PD 620, PD responds to test signal 650 with test response signal 651, notifying control hub 610 to take over control of PD 620. As depicted in FIG. 6E, control hub 610 transmits the control instructions to PD 620 via control signals 630. PD 620 executes the control instructions and, in some embodiments, responds via control response signals 631 to control signals 630. In some embodiments, control hub 610 notifies control hubs 612, 614 that PD 620 responds to control signals 630, and each updates the system operation information to designate control hub 610 as PD's 620 control hub.

As depicted above with regard to FIGS. 5 and 6A-E, the PD microcontroller, the control hub hardware memory, and/or the other control hubs' hardware memory include signal communication instructions for communicating long range spread spectrum signals, narrowband frequency shift keying signals, or both. The signal communication instructions are executed by one or more of the PD microcontroller, the control hub hardware processors, or the other control hubs' hardware processors to transmit long range spread spectrum signals, narrowband frequency shift keying signals, or both, via one or more of the PD transceiver, the control hub transceiver, or the other control hubs' transceivers.

Figure 7A:
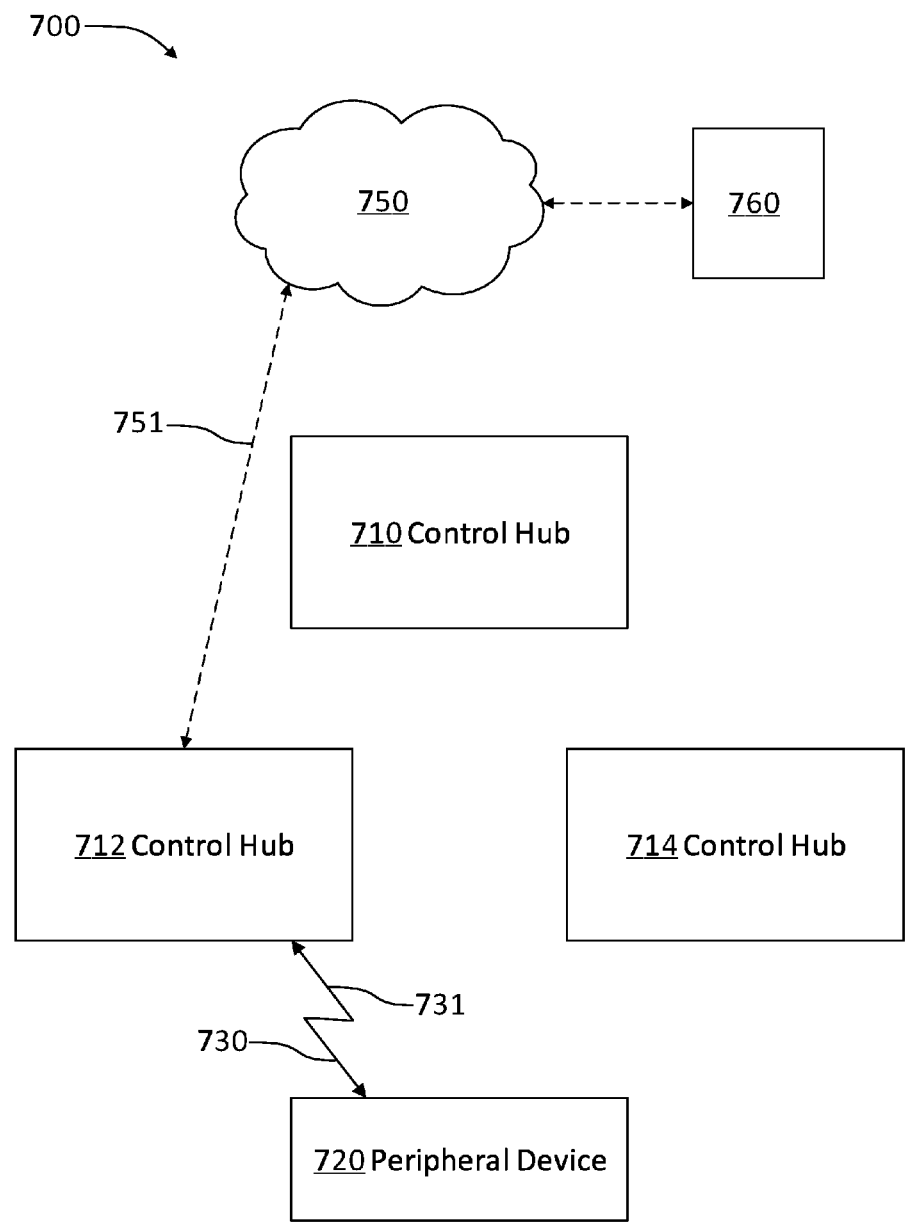
FIGS. 7A-E depict a redundant star network that communicates with a cloud server and user device.

FIGS. 7A-E depict a redundant star network that communicates with a cloud server and user device. As depicted in FIG. 7A, network 700 includes control hub 710, control hub 712, control hub 714 and PD 720, each of which are similar to the control hubs and PDs described above with regards to FIGS. 5 and 6A-E. Additionally, network 700 includes server 750, which is one among a cloud of servers. Server 750 is networked to control hub 712 and, in some embodiments (though not depicted) control hubs 710, 714 via wired network connection 751. Server 750 includes hardware memory that stores the system operation information. Server 750 is also, in the depicted embodiment, networked to user device 760, and pushes system information, such as updates and operations performed by networked devices, to user device 760.

Figure 7B:
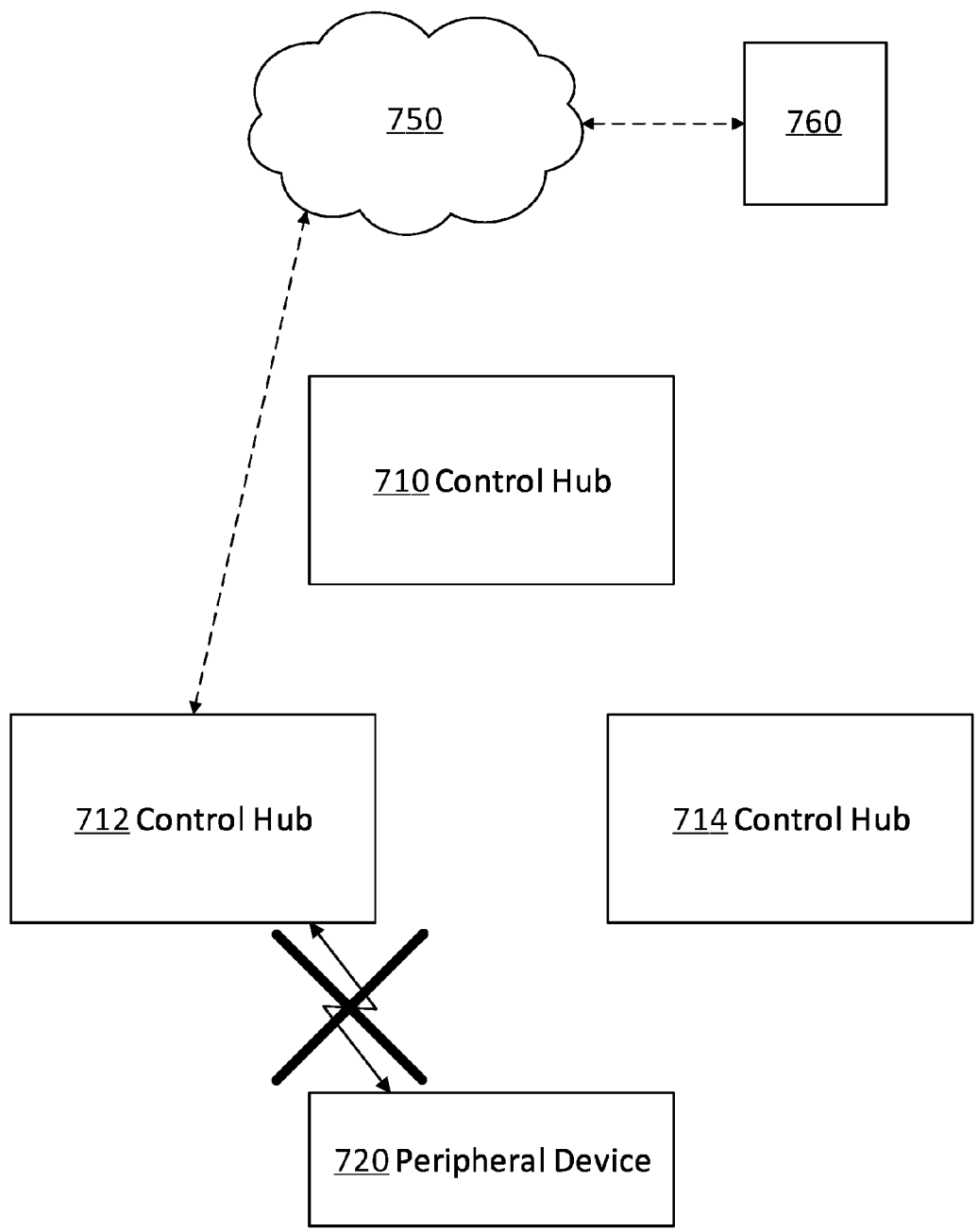
Figure 7C:
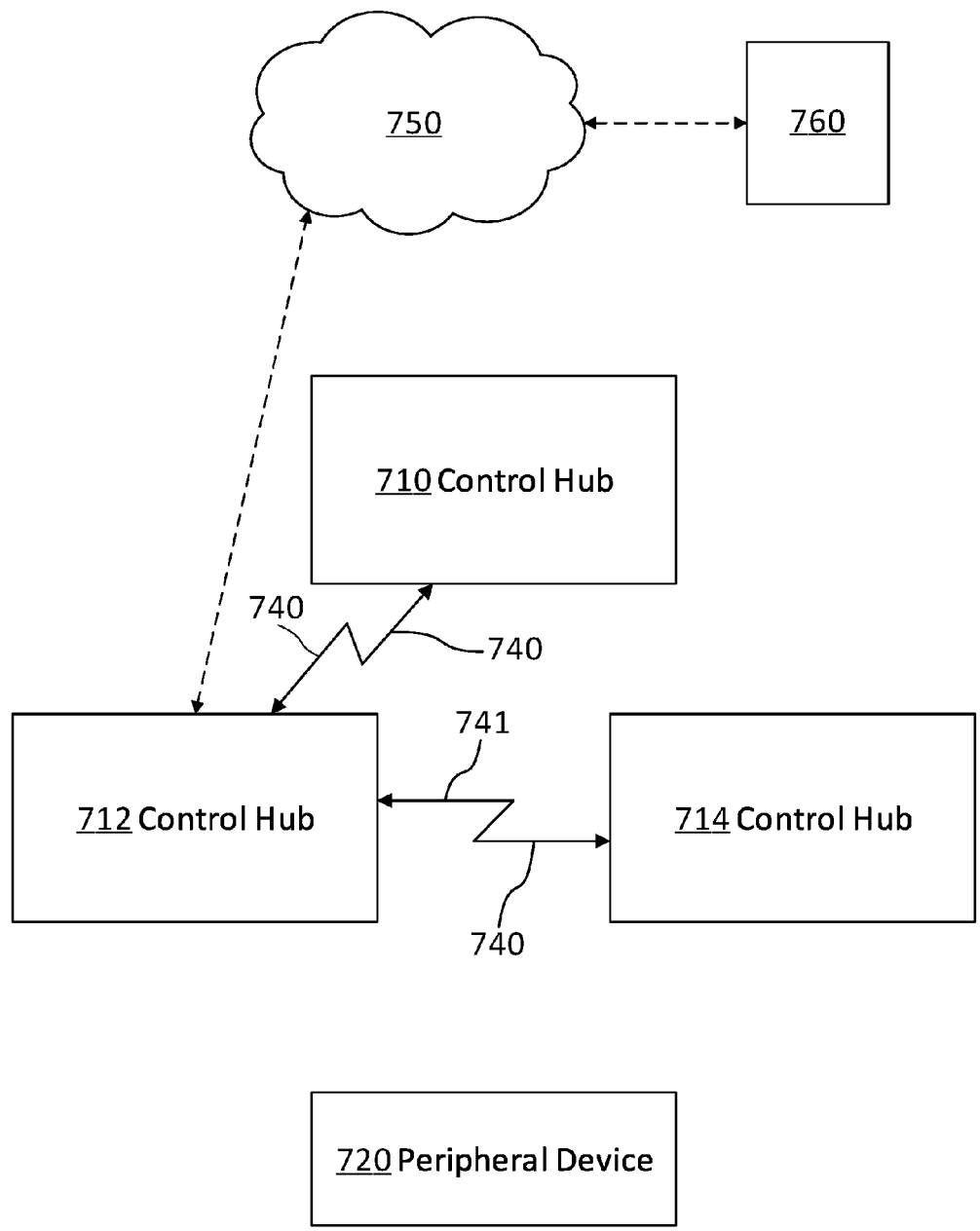

Control hub 712 controls PD 720 via control signals 730. In some embodiments, PD 720 responds to control signals 730 when the control instructions are executed by PD 720 via response signals 731. As depicted in FIG. 7B, in some embodiments, control signals 730 and response signals 731 fail to establish communication between control hub 712 and PD 720. As depicted in FIG. 7C, control hub 712 sends test request signals 740 to control hubs 710, 714 to request that control hubs 710, 714 test whether PD 720 is within a transmit receive range for either control hub 710, 714. In some embodiments, control hubs 710, 714 respond via test request response signals 741 to acknowledge the test request. Additionally, in some embodiments, control hub 712, control hub 710 and/or control hub 714 transmit the test request and/or acceptance of the test request via wired network connection 751. For example, in one embodiment, the system operation information includes instructions that instruct control hub 712 to notify server 750 response 731 from PD 720 is not received by control hub 712, and control hub 710 requested control hubs 710, 714 send test signals to PD 720. Furthermore, in some embodiments, the server hardware memory stores instructions that instruct server 750 to notify a user via user device 760 response 731 from PD 720 is not received by control hub 712, and control hub 712 requested control hubs 710, 714 send test signals to PD 720.

Figure 7D:
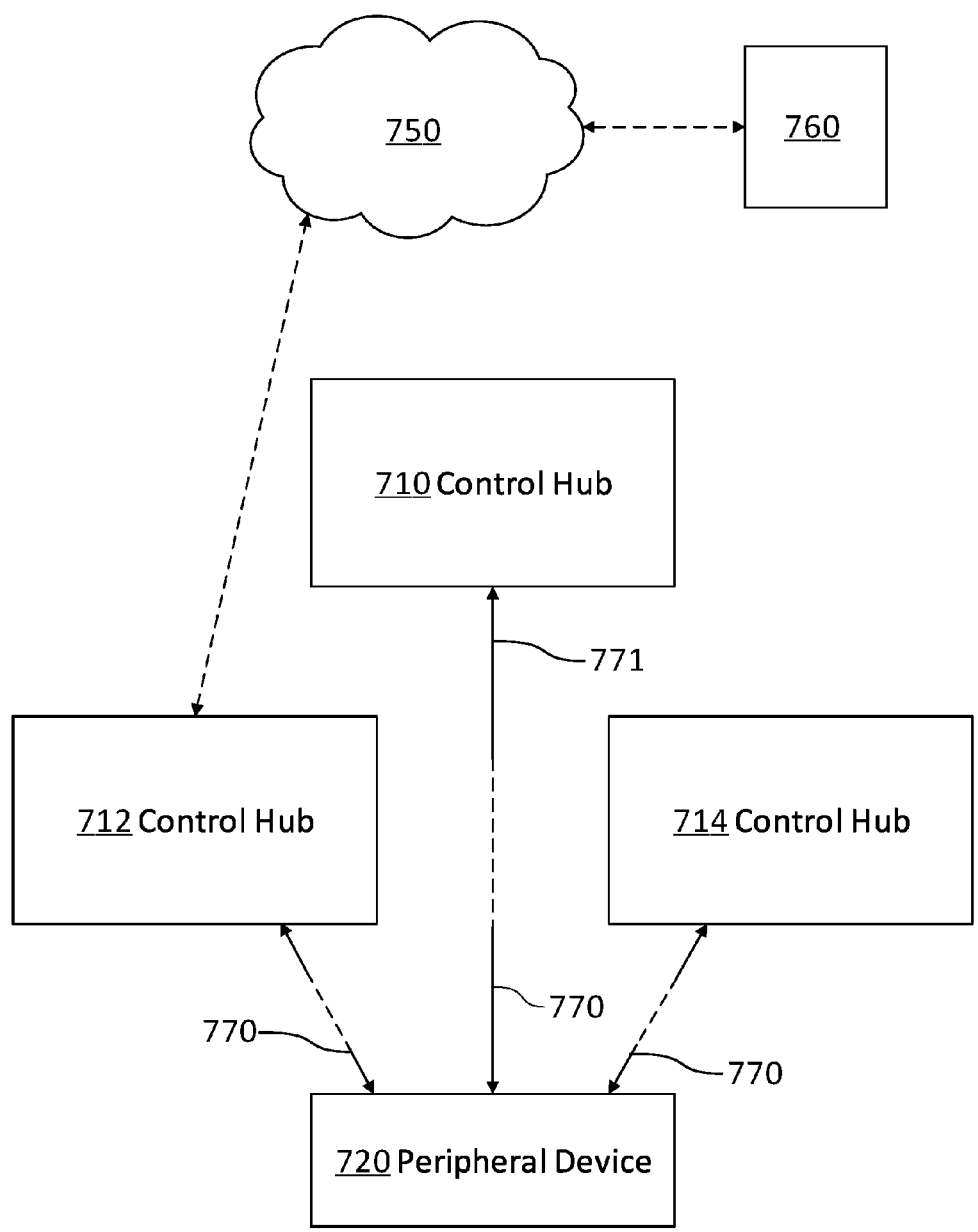

As depicted in FIG. 7D, control hubs 710, 712, 714 send test signals 750 to test whether PD 720 is within a transmit-receive range for any of control hubs 710, 712, 714. When PD 720 is within a transmit receive range, such as within a transmit-receive range between control hub 710 and PD 720, PD responds to test signal 750 with test response signal 751, notifying control hub 710 to take over control of PD 720.

Figure 7E:
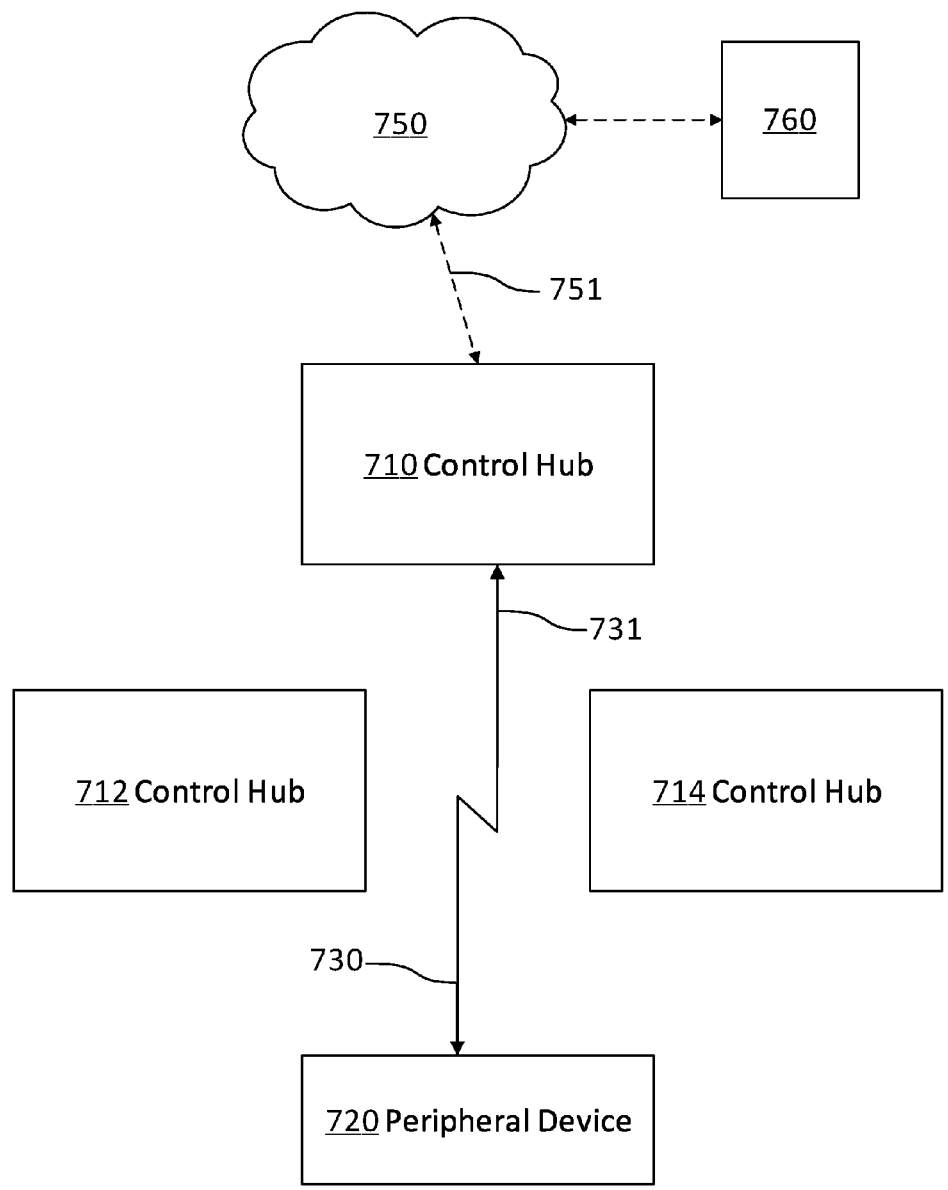

As depicted in FIG. 7E, control hub 710 transmits the control instructions to PD 720 via control signals 730. PD 720 executes the control instructions and, in some embodiments, responds via response signals 731 to control signals 730. In some embodiments, the system operation information includes instructions that instruct control hub 710 to notify server 750 via wired connection 751 the takeover instructions are executed by control hub 710. In further embodiments, the server hardware memory stores instructions that instruct server 750 to notify a user via user device 760 the takeover instructions are executed by control hub 710.

Figure 8:
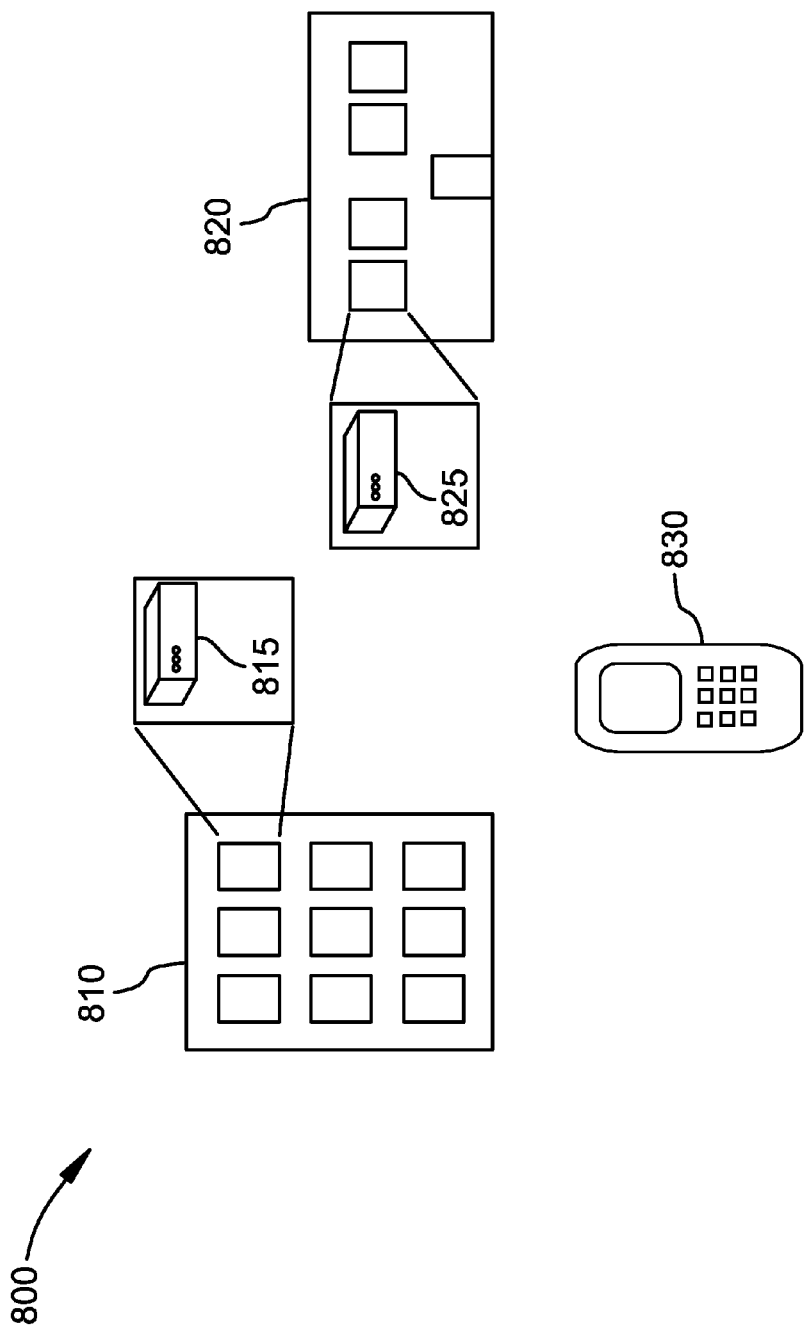
FIG. 8 depicts a specific embodiment of a redundant star network such as a network for a multi-building industrial complex.

FIG. 8 depicts a specific embodiment of a redundant star network such as a network for a multi-building industrial complex. Industrial complex 800 includes building 810, which houses network hub 815, and building 820, which houses network 825. Industrial complex 800 includes several mobile PDs that are transported around industrial complex 800. In the present embodiment, the PD is handheld barcode scanner 830 for tracking inventory. Scanner 830 includes a long range transceiver and microcontroller as described for PDs above. Network hubs 815, 825 store inventory location information for inventory located around industrial complex 800. In one example embodiment, a user requests to know, via scanner 830, when certain inventory arrives at industrial complex 800. Scanner 830 transmits the request to network hub 815, which updates the system operation information with the request. When the certain inventory arrives at industrial complex 800, network hub 815 transmits a notification and receipt request to scanner 830, however, scanner 830 is located outside network hub's 815 range. Network hub 815 requests network hub 825 take over control of scanner 830 and transmit the notification to scanner 830. Network hub 830 transmits the notification and receipt request to scanner 830, which receives the notification and sends the request receipt response to network hub 825.

Figure 9:
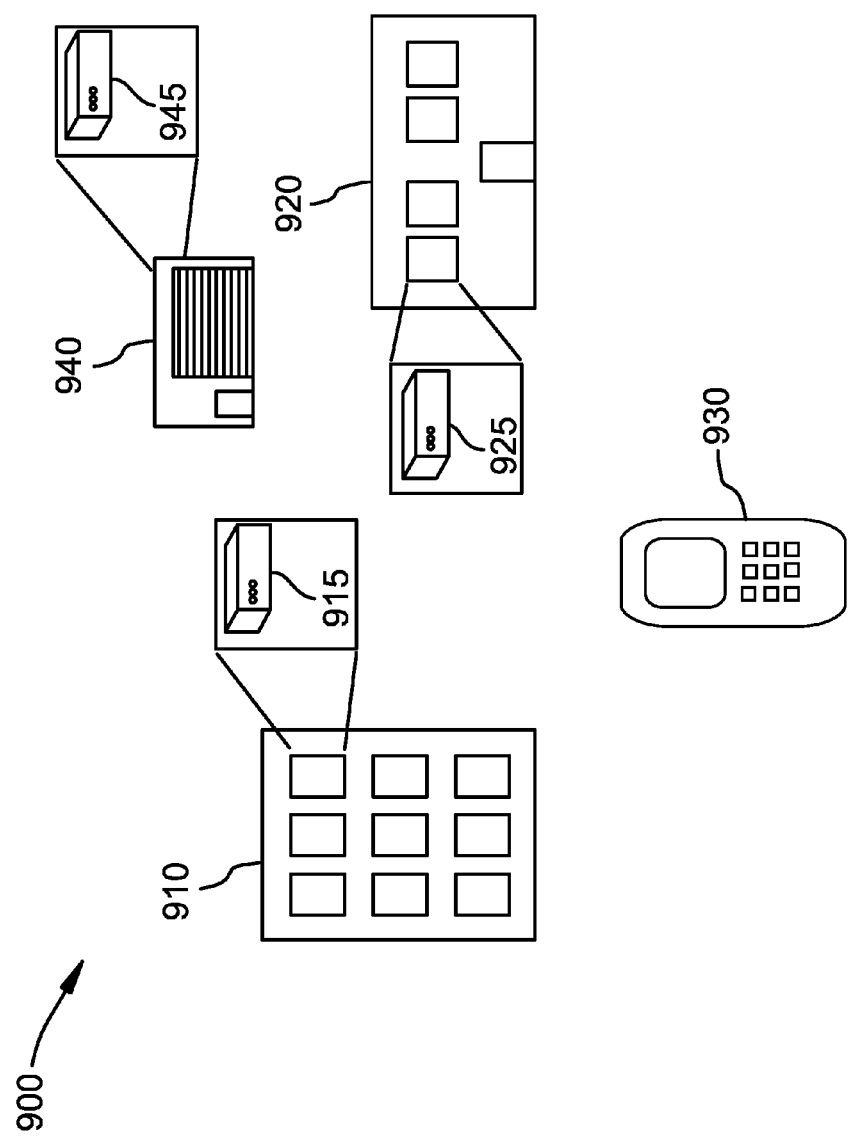
FIG. 9 depicts another specific embodiment of a redundant star network such as a network for a multi-building industrial complex.

FIG. 9 depicts another specific embodiment of a redundant star network such as a network for a multi-building industrial complex. Industrial complex 900 includes building 910, which houses network hub 915, building 920, which houses network 825, and building 940 which houses network hub 945. Industrial complex 900 includes several mobile PDs that are transported around industrial complex 900. In the present embodiment, the PD is handheld barcode scanner 930 for tracking inventory. Scanner 930 includes a long range transceiver and microcontroller as described for PDs above. Network hubs 915, 925, 945 store inventory location information for inventory located around industrial complex 900. In one example embodiment, a user requests to know, via scanner 930, when certain inventory arrives at industrial complex 900. Scanner 930 transmits the request to network hub 915, which updates the system operation information with the request. When the certain inventory arrives at industrial complex 900, network hub 915 transmits a notification and receipt request to scanner 930, however, scanner 930 is located outside network hub's 915 range. Network hub 915 requests network hubs 925, 945 send test signals designated for scanner 930 to test where scanner 930 is around industrial complex 900. Network hubs 915, 925, 945 transmit test signals designated for scanner 930, and scanner 930 responds to test signals send from, for example, network hub 945. Network hub 945 takes over control of scanner 930 and transmits the notification to scanner 930. Network hub 930 transmits the notification and receipt request to scanner 930, which receives the notification and sends the request receipt response to network hub 945.

In addition to the benefits already discussed, a redundant star network as described above provides power savings for network hubs and PDs, which often run on small batteries with limited power supply. Polling for a PD only when functionality of the PD is necessary reduces power consumption of the PD and greatly extends battery life for the PD.

Figure 10:
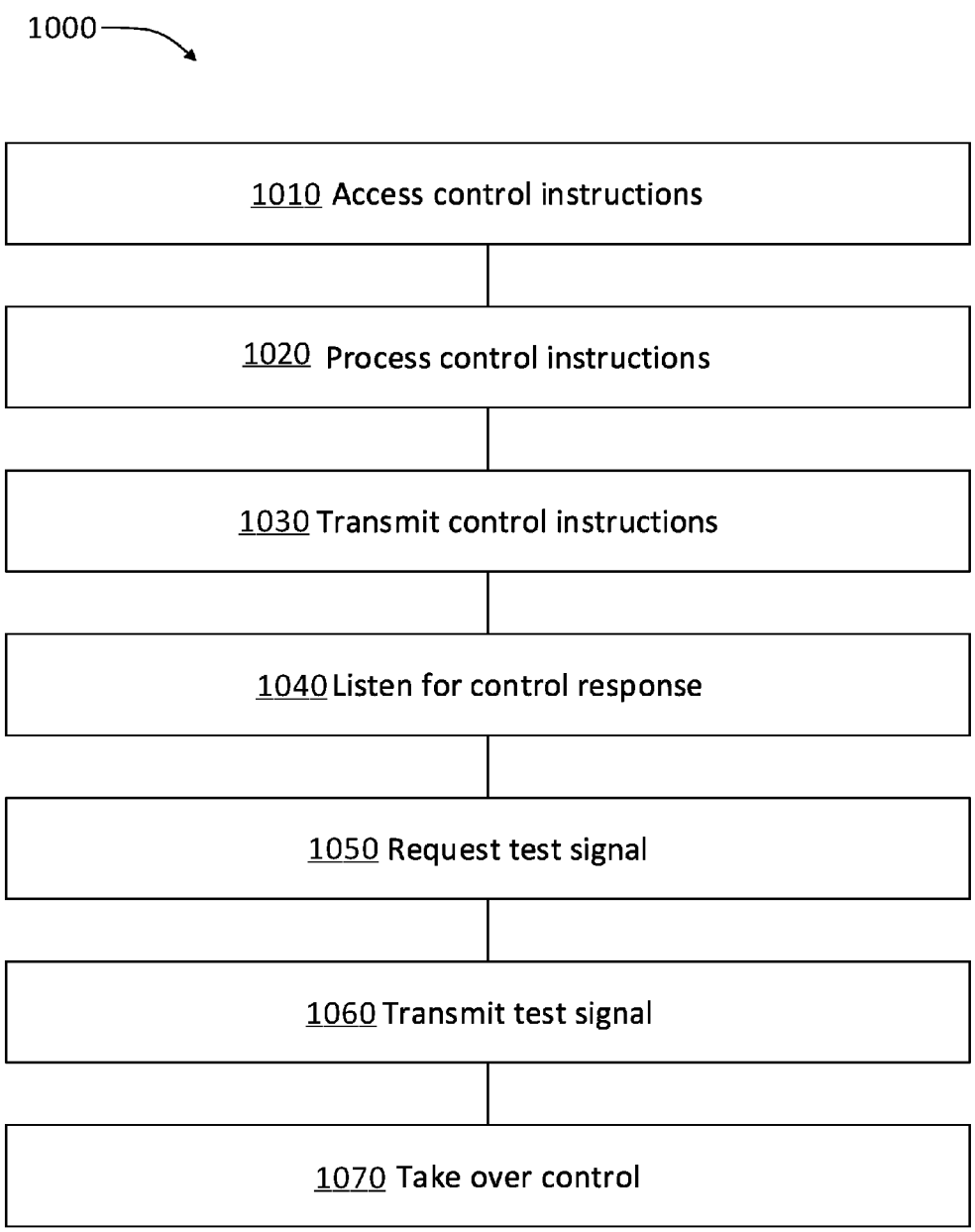
FIG. 10 depicts an example embodiment of a method for communicating over a redundant star network.

FIG. 10 depicts an example embodiment of a method for communicating over a redundant star network. Method 1000 includes block 1010. At block 1010, control instructions are accessed by one or more hardware processors of a first control hub. The control instructions are for controlling a PD and are stored in hardware memory of the first control hub. At block 1020, the first control hub hardware processors process the control instructions, for example, to execute the instructions and determine a control signal encoded with the control instructions to be sent to the PD. At block 1030, the control instructions are transmitted by a transceiver of the first control hub. At block 1040, the first control hub listens, via the first control hub transceiver, for a control response from the PD in response to the control instructions. The listening is performed over an expected response timeframe. At block 1050, the first control hub requests that one or more additional control hubs transmit a test signal designated for the PD. The first control hub processors execute the request instructions when the first control hub does not receive the control response from the PD within the expected response timeframe. At block 1060, at least one of the additional control hubs or the first control hub, or at least one of the additional control hubs and the first control hub transmit, via respective wireless long range transceivers, the test signal. At block 1070, one of the additional control hubs takes over control of the PD upon receiving a test signal response from the PD. The additional control hub which takes over control of the PD controls the PD.

Figure 11:
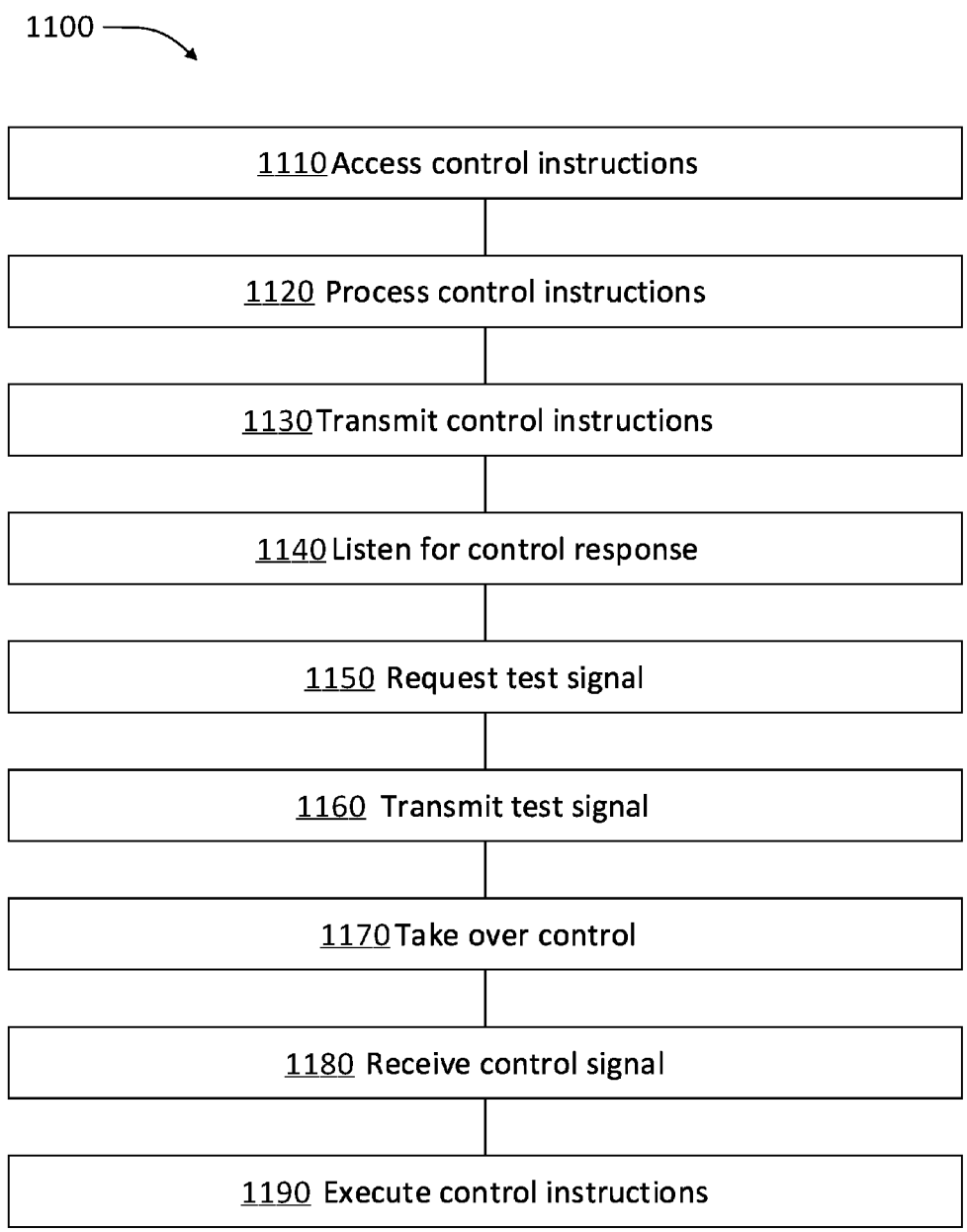
FIG. 11 depicts another example embodiment of a method for communicating over a redundant star network.

FIG. 11 depicts another example embodiment of a method for communicating over a redundant star network. Method 1100 includes block 1110. At block 1110, control instructions are accessed by one or more hardware processors of a first control hub. The control instructions are for controlling a PD and are stored in hardware memory of the first control hub. At block 1120, the first control hub hardware processors process the control instructions, for example, to execute the instructions and determine a control signal encoded with the control instructions to be sent to the PD. At block 1130, the control instructions are transmitted by a transceiver of the first control hub. At block 1140, the first control hub listens, via the first control hub transceiver, for a control response from the PD in response to the control instructions. The listening is performed over an expected response timeframe. At block 1150, the first control hub requests that one or more additional control hubs transmit a test signal designated for the PD. The first control hub processors execute the request instructions when the first control hub does not receive the control response from the PD within the expected response timeframe. At block 1160, at least one of the additional control hubs or the first control hub, or at least one of the additional control hubs and the first control hub transmit, via respective wireless long range transceivers, the test signal. At block 1170, one of the additional control hubs takes over control of the PD upon receiving a test signal response from the PD. The additional control hub which takes over control of the PD controls the PD by, for example, transmitting a control signal to the PD. At block 1180, the PD receives the control instructions at a wireless long range transceiver. At block 1190, the PD executes the control instructions at a PD microcontroller.

The invention claimed is:
1. A system comprising:
a peripheral device having a wireless long range transceiver and a microcontroller;
a first control hub having a wireless long range transceiver, one or more hardware processors, and hardware memory that stores system operation information; and a second control hub having a wireless long range transceiver, one or more hardware processors, and hardware memory that stores the system operation information, wherein the system operation information further comprises:

instructions for controlling the peripheral device, wherein the first control hub controls the peripheral device by executing the control instructions at the first control hub hardware processors and transmitting the executed control instructions designated for the peripheral device via the first control hub wireless long range transceiver;

instructions for listening for a response from the peripheral device in response to the control instructions, wherein the listening instructions comprise an expected response timeframe after the control instructions are sent;

instructions for requesting the second control hub control the peripheral device, wherein the first control hub processors execute the request instructions when the first control hub does not receive the response from the peripheral device in response to the control instructions within the expected response timeframe, and wherein the first control hub transmits, via the first control hub transceiver, a takeover request designated for the second control hub; and instructions for taking over control of the peripheral device, wherein the second control hub executes the takeover instructions upon receiving the takeover request, and wherein the second control hub controls the peripheral device by executing the control instructions at the second control hub hardware processors and transmitting the executed control instructions designated for the peripheral device via the second control hub wireless long range transceiver.

2. The system of claim 1, wherein the peripheral device receives the control instructions from the second control hub via the peripheral device wireless long range transceiver and executes the control instructions at the microcontroller.

3. The system of claim 1, further comprising a server, wherein the server is one among a cloud of servers, wherein the server is networked to the first control hub and the second control hub via a wired network connection, and wherein the server comprises hardware memory that stores the system operation information.

4. The system of claim 3, wherein the system operation information includes instructions that instruct the first control hub to notify the server:

the response from the peripheral device is not received by the first control hub; and the first control hub requested the second control hub take over control of the peripheral device.

5. The system of claim 4, wherein the server hardware memory stores instructions that instruct the server to notify a user:

the response from the peripheral device is not received by the first control hub; and the first control hub requested the second control hub take over control of the peripheral device.

6. The system of claim 3, wherein the system operation information includes instructions that instruct the second control hub to notify the server the takeover instructions are executed by the second control hub.

7. The system of claim 6, wherein the server hardware memory stores instructions that instruct the server to notify a user the takeover instructions are executed by the second control hub.

8. The system of claim 1, wherein one or more of the peripheral device microcontroller, the first control hub hardware memory, or the second control hub hardware memory comprise signal communication instructions for communicating long range spread spectrum signals, narrowband frequency shift keying signals, or both, and wherein the signal communication instructions are executed by one or more of the peripheral device microcontroller, the first control hub hardware processors, or the second control hub hardware processors to transmit long range spread spectrum signals, narrowband frequency shift keying signals, or both, via one or more of the peripheral device transceiver, the first control hub transceiver, or the second control hub transceiver.

9. A system comprising:

a peripheral device having a wireless long range transceiver and a microcontroller;

a first control hub having a wireless long range transceiver, one or more hardware processors, and hardware memory that stores system operation information; and two or more additional control hubs, each having a wireless long range transceiver, one or more hardware processors, and hardware memory that stores the system operation information, wherein the system operation information further comprises:

instructions for controlling the peripheral device, wherein the first control hub controls the peripheral device by executing the control instructions at the first control hub hardware processors and transmitting the executed control instructions designated for the peripheral device via the first control hub wireless long range transceiver;

instructions for transmitting a test signal designated for the peripheral device;

instructions for listening for a response from the peripheral device in response to the control instructions, the test signal, or both, wherein the listening instructions include an expected response timeframe after the control instructions, the test signal, or both, are sent;

instructions for requesting the additional control hubs transmit the test signal, wherein the first control hub processors execute the request instructions when the first control hub does not receive the response from the peripheral device within the expected response timeframe; and instructions for taking over control of the peripheral device, wherein at least one of the additional control hubs executes the takeover instructions upon receiving the test signal response from the peripheral device, and wherein the at least one of the additional control hubs controls the peripheral device by executing the control instructions at the hardware processors and transmitting the executed control instructions designated for the peripheral device via the second control hub wireless long range transceiver.

10. The system of claim 9, wherein the peripheral device receives the control instructions from the at least one of the additional control hubs via the peripheral device wireless long range transceiver and executes the control instructions at the microcontroller.

11. The system of claim 9, further comprising a server, wherein the server is one among a cloud of servers, wherein the server is networked to one or more of the additional control hubs, the first control hub, or each of the additional control hubs and the first control hub via a wired network connection, and wherein the server comprises hardware memory that stores the system operation information.

12. The system of claim 11, wherein the system operation information includes instructions that instruct the first control hub to notify the server:
the response from the peripheral device is not received by the first control hub; and
the first control hub requested the additional control hubs transmit the test signal.

13. The system of claim 12, wherein the server hardware memory stores instructions that instruct the server to notify a user:
the response from the peripheral device is not received by the first control hub; and
the first control hub requested the additional control hubs transmit the test signal.

14. The system of claim 11, wherein the system operation information includes instructions that instruct the at least one of the additional control hubs to notify the server the takeover instructions are executed by the second control hub.

15. The system of claim 11, wherein the server hardware memory stores instructions that instruct the server to notify a user the takeover instructions are executed by the at least one of the additional control hubs.

16. The system of claim 9, wherein one or more of the peripheral device microcontroller, the first control hub hardware memory, or the second control hub hardware memory comprise signal communication instructions for communicating long range spread spectrum signals, narrowband frequency shift keying signals, or both, and wherein the signal communication instructions are executed by one or more of the peripheral device microcontroller, the first control hub hardware processors, or the second control hub hardware processors to transmit long range spread spectrum signals, narrowband frequency shift keying signals, or both, via one or more of the peripheral device transceiver, the first control hub transceiver, or the second control hub transceiver.

17. A method comprising
accessing, by one or more hardware processors of a first control hub, control instructions for a peripheral device stored in hardware memory of the first control hub;
processing, by the first control hub hardware processors, the control instructions;
transmitting, by a transceiver of the first control hub, the control instructions to the peripheral device;
listening, by the first control hub transceiver, for a control response from the peripheral device, wherein the listening is performed over an expected response timeframe, and wherein the response is in response to the control instructions;
requesting, by the first control hub, that one or more additional control hubs transmit a test signal, wherein the first control hub processors execute the requesting step when the first control hub does not receive the control response from the peripheral device within the expected response timeframe;
transmitting, by one or more of the first control hub transceiver or a transceiver of at least one of the additional control hubs, the test signal; and
taking over control of the peripheral device by the at least one of the additional control hubs, wherein the at least one of the additional control hubs executes the takeover upon receiving a test signal response from the peripheral device, and wherein the at least one of the additional control hubs controls the peripheral device.

18. The method of claim 17, further comprising receiving the control instructions at a transceiver of the peripheral device.

19. The method of claim 18, further comprising executing the control instructions at a microcontroller of the peripheral device.

20. The method of claim 17, wherein the transmitting the test signal, the transmitting the control instructions, or both, comprises one or more of long range spread spectrum signal transmission or narrowband frequency shift keying signal transmission.

* * * * *